(12) United States Patent
Legg et al.

(10) Patent No.: US 11,323,168 B2
(45) Date of Patent: May 3, 2022

(54) COMMUNICATION SYSTEM AND METHOD FOR COMMUNICATION WITH VEHICLE BASED NODE

(71) Applicant: BluWireless Technology Limited, Bristol (GB)

(72) Inventors: Peter Jonathon Legg, Bristol (GB); Raymond Mark McConnell, Bristol (GB); Stuart Ryan, Bristol (GB)

(73) Assignee: BluWireless Technology Limited, Bristol (GB)

( * ) Notice: Subject to any disclaimer, the term of this patent is extended or adjusted under 35 U.S.C. 154(b) by 63 days.

(21) Appl. No.: 17/091,442

(22) Filed: Nov. 6, 2020

(65) Prior Publication Data

US 2021/0143890 A1 May 13, 2021

(30) Foreign Application Priority Data

Nov. 10, 2019 (GB) ..................................... 1916333

(51) Int. Cl.
*H04B 7/06* (2006.01)
*H04W 76/15* (2018.01)
*H04W 36/00* (2009.01)

(52) U.S. Cl.
CPC ......... *H04B 7/0695* (2013.01); *H04B 7/0617* (2013.01); *H04W 36/0027* (2013.01); *H04W 76/15* (2018.02)

(58) Field of Classification Search
None
See application file for complete search history.

(56) References Cited

U.S. PATENT DOCUMENTS

| | | | | |
|---|---|---|---|---|
| 11,109,449 B1* | 8/2021 | McConnell | ......... | H04W 84/005 |
| 11,152,985 B1* | 10/2021 | Legg | .................... | H04B 7/0608 |
| 11,246,082 B1* | 2/2022 | McConnell | ........... | H04L 5/0032 |
| 2021/0195485 A1* | 6/2021 | Legg | .................... | H04W 36/08 |
| 2021/0392709 A1* | 12/2021 | Legg | .................... | H04B 7/0408 |
| 2022/0052731 A1* | 2/2022 | Legg | .................... | H04W 76/15 |

FOREIGN PATENT DOCUMENTS

| | | | |
|---|---|---|---|
| EP | 3840451 A1 | 6/2021 | |
| WO | 2011127189 A1 | 10/2011 | |
| WO | WO2011127189 A2 | 10/2011 | |
| WO | 2019120479 A1 | 6/2019 | |
| WO | WO2019120479 A1 | 6/2019 | |

* cited by examiner

*Primary Examiner* — Anh Vu H Ly
(74) *Attorney, Agent, or Firm* — Optimus Patents US, LLC

(57) ABSTRACT

A communication system comprises an access point communicating via a directional beam and a first and second wireless modem for establishing a first and respectively second mm wave radio communication link to the first access point. The first and second wireless modems are located on a vehicle and employ electronically steerable beamforming directional antennas having a first main beams for establishing the radio communication links A proximity detector detects proximity of the first wireless modem to the first access point. A switch controller switches data of a data flow from the first mm wave radio communication link to the second mm wave radio communication link in response to the detection of the proximity of the first wireless modem to the first access point.

18 Claims, 11 Drawing Sheets

COMMUNICATION SYSTEM AND METHOD FOR COMMUNICATION WITH VEHICLE BASED NODE

FIELD OF THE INVENTION

The invention relates to a communication system, apparatus, and method for communication with vehicle based node wireless communication to a vehicle, and in particular, but not exclusively, to wireless communication to a node on a train.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example, in order to support high capacity Internet access onboard trains.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast moving vehicle, a significant amount of air interface resource (spectrum) is required, and this tends to restrict the capacity that can be provided by many existing systems in already used frequency ranges. This in particular applies to both cellular and Wi-Fi based wireless communication systems. It is therefore desirable to exploit less used frequency bands and there is substantial interest in providing high capacity support of fast moving vehicles using millimetre-wave (mm) wavelength based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of air interface in mm wave communication and with potentially fast-moving vehicles is a difficult challenge. This challenge is further exacerbated by the desire to provide this function in communication systems that are compatible with many existing network techniques and principles, such as Internet Protocol based routing, existing network-based mobility functions etc.

Hence, an improved approach for supporting communication with moving vehicles via mm wave radio communication links would be advantageous. In particular, an approach that allows improved operation, improved reliability, increased flexibility, facilitated implementation, facilitated operation, improved resource utilization, improved performance and/or improved support for communication with vehicles would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention there is provided a communication system for supporting communication between an end node of a vehicle and a remote correspondent node via a fixed network, the communication system comprising: a plurality of wireless access points of the fixed network including at least a first access point having a directional antenna arrangement for mm wave radio communication using directional beams; a first wireless modem for establishing a first mm wave radio communication link to the first access point supporting communication between the end node of a vehicle and the remote correspondent node, the first wireless modem being located on the vehicle and employing a first electronically steerable beamforming directional antenna having a first main beam for establishing the first mm wave radio communication link; a second wireless modem for establishing a second mm wave radio communication link to the first access point supporting communication between the end node of a vehicle and the remote correspondent node, the second wireless modem being located on the vehicle and employing a second electronically steerable beamforming directional antenna having a second main beam for establishing the second mm wave radio communication link; a proximity detector for detecting a proximity of the first wireless modem to the first access point; and a switch controller for switching data of a data flow from the first mm wave radio communication link to the second mm wave radio communication link in response to the detection of the proximity of the first wireless modem to the first access point.

The invention may provide improved and/or facilitated operation and/or improved performance for a beamform based mm wave radio communication system supporting (potentially fast) moving vehicles.

The approach may in particular provide more efficient and/or reliable communication for a vehicle passing close by an access point and/or may substantially reduce the requirements on the functionality supporting the communication.

Specifically, the operation and requirements for adaptive beamforming may often be substantially reduced.

The use of beams from the directional antennas may specifically support radio communication links from different wireless modems of the vehicle to the same access point. It may allow steering of the beams towards the same access point thereby enabling or improving multiple links between the vehicle and a single access point. This may provide improved performance and in particular may provide improved scheduling over the air interface.

The approach may in particular provide efficient and reliable communication when the vehicle passes by an access point supporting multiple simultaneous radio communication links for the same end node.

A specific advantage of the approach is that an interruption of service to the vehicle can often be avoided. For example, if current communication with the vehicle for the end node is based on a single link from the first wireless modem, this may suddenly drop when the vehicle passes the first access point. This may however be predicted and anticipated by the current approach and the communication may be switched to a link with the second wireless modem which is further away and for which a communication link can be supported. The system may in many embodiments seamlessly switch bandwidth for the end node for the same access point from one link to a second link with a different wireless modem thereby maintaining support for the end node.

The end node and/or wireless modems may be in/on/attached to/move with etc. the vehicle, and may be part of a mobile network that moves with the vehicle.

The switching of data of the data flow may be by biasing scheduling of data from the first mm wave radio communication link towards the second mm wave radio communication link in response to the proximity detection. An air interface section of a communication path/route between the end node and the correspondent node may be formed at least partly by the first mm wave radio communication link and the second mm wave radio communication link and switching of data may be by increasing a weighting/bias for scheduling of data of the data flow over the second mm wave radio communication link relative to the first mm wave radio communication link when a proximity detection occurs.

The switching of data may be by allocating some data of the data flow for communication over the second mm wave radio communication link when a proximity detection has occurred that would have been allocated for communication over the first mm wave radio communication link if no proximity detection has occurred.

The switching of data may in some cases be by not allowing/enabling communication over the first mm wave radio communication link following a proximity detection. The switching of data may in some cases be by dropping or terminating the first mm wave radio communication link following a proximity detection.

The first mm wave radio communication link is formed using a first directional beam of the directional antenna arrangement of the first access point. The second mm wave radio communication link is formed using a second directional beam of the directional antenna arrangement of the first access point. The second directional beam of the directional antenna arrangement may in some situations be the same beam as the first directional beam of the directional antenna arrangement.

The proximity detector may be arranged to detect the proximity in response to a detection that one or more operational parameters match a proximity criterion. The specific parameters and the proximity criterion may depend on the specific embodiment.

According to an optional feature of the invention, the switch controller is arranged to switch the data of the data flow from the first mm wave radio communication link to the second mm wave radio communication link for the second wireless modem being further from the first access point than the first wireless modem.

In many embodiments, the proximity detector may be arranged to detect the proximity of the first wireless modem to the first access point in response to a detection that a direction of arrival of a transmission between the first access point and the first wireless modem meets a criterion.

According to an optional feature of the invention, the proximity detector is arranged to detect the proximity of the first wireless modem to the first access point in response to a detection that a direction of arrival of a transmission from the first access point to the first wireless modem meets a criterion.

According to an optional feature of the invention, the proximity detector is arranged to detect the proximity of the first wireless modem to the first access point in response to a detection that a direction of arrival of a transmission from the first wireless modem to the first access point meets a criterion.

The criteria may in many embodiments comprise a requirement that a difference between the direction of arrival and a nominal direction for the first electronically steerable beamforming directional antenna or the directional antenna arrangement exceeds a threshold.

According to an optional feature of the invention, the proximity detector is arranged to detect the proximity of the first wireless modem to the first access point in response to a direction of the first main beam meeting a criterion.

According to an optional feature of the invention, the proximity detector is arranged to detect the proximity of the first wireless modem to the access point in response to a direction of a directional beam of the directional antenna arrangement for the first mm wave radio communication meeting a criterion.

The criteria for proximity detection based on beam directions may in many embodiments comprise a requirement that a difference between the direction of the beam and a nominal direction for the beam exceeds a threshold.

Particularly advantageous operation may often be achieved by the above mentioned. proximity detections. In particular it may provide reliable and/or suitable proximity detection based on operational parameters that may directly impact performance when e.g. a vehicle passes close by the first access point.

According to an optional feature of the invention, the communication system may further comprise a position determiner arranged to determine a position of the first wireless modem from signals of an external positioning system, and the proximity detector may be arranged to detect the proximity of the first wireless modem to the access point in response to a comparison of the position of the first wireless modem to a predetermined position of the first access point.

The positioning system may for example be a GPS positioning system.

According to an optional feature of the invention, the switch controller is arranged to switch data of the data flow to the second mm wave radio communication link such that no data of the data flow is communicated over the first mm wave radio communication link This may provide particularly efficient performance in many embodiments and may prevent that any data is transmitted over an undesirable communication link. The switch controller may in some embodiments be arranged to drop or terminate the first mm wave radio communication link in response to the proximity detection.

For example, prior to the proximity detection, data of the data flow may be communicated over both the first mm wave radio communication link and the second mm wave radio communication link. In response to the proximity detection, no data may be communicated over the first mm wave radio communication link and all data may be communicated over the second mm wave radio communication link. The switch controller 807 may be arranged to switch the communication from a multipath communication using both the first and second mm wave radio communication links to a single path communication using only the second mm wave radio communication link.

According to an optional feature of the invention, the first and second electronically steerable beamforming directional antennas are at least 20 meters apart.

In some embodiments, the first and second electronically steerable beamforming directional antennas may be at least 5, 10, 50, 100, 200, 300, or 400 meters apart.

According to an optional feature of the invention, the first wireless modem and the second wireless modem have different MAC addresses.

The first and second wireless modems may be different MAC entities in the network. The system may improve and/or allow network based mobility and air interface management.

In some embodiments, a scheduler for scheduling data of the data flow is arranged to schedule data for the end node by selecting different intermediate modem MAC addresses for data packets addressed to the end node.

According to an optional feature of the invention, the communication system further comprises an aggregator located on the vehicle and arranged to combine data for the end node received via the first mm wave radio communication link and data for the end node received via the second mm wave radio communication link into a single in-sequence data stream and forwarding this data stream to the end node.

This may provide substantially improved and/or facilitated operation in many embodiments. The aggregator may specifically be (or comprise) a multipath proxy. The multipath proxy may interwork with a complementary multipath proxy of the fixed network to provide single connection points at respectively the vehicle and the fixed network while maintaining a plurality of sub-connections/sub-flows between the two multipath proxies. At least some sub-flows may be associated with different radio communication links, and the first and second mm wave radio communication links may specifically be linked to different subflows. The scheduler may be arranged to schedule data over the two mm wave radio communication links by selecting between different subflows for the data. The switching of data from the first mm wave radio communication link to the second mm wave radio communication link in response to a proximity detection may be by the multipath proxy switching data from the sub-flow for the first mm wave radio communication link to the sub-flow for the second mm wave radio communication link.

According to an optional feature of the invention, the communication system further comprises a multipath controller arranged to allocate data of the data flow over a plurality of subflows, each subflow using a different mm wave radio communication link; and the switch controller is arranged to switch data of the data flow by controlling the multipath controller to bias the allocation of data of the data flow towards a subflow for the second mm wave radio communication link relative to a subflow of the first mm wave radio communication link in response to the detection of the proximity of the first wireless modem to the first access point.

According to an optional feature of the invention, the first wireless modem and the second wireless modem are positioned proximal to opposite ends of the vehicle.

The distance between the first wireless modem and the second wireless modem may be at least twice a distance from the first wireless modem to a first end of the vehicle and at least twice a distance from the second wireless model to a second end of the vehicle. The first and second end may be opposite ends of the vehicle. The first end may be the front of the vehicle. The second end may be the back/rear of the vehicle.

According to an optional feature of the invention, the first wireless modem comprises a first beam adapter for adaptively steering the first main beam towards the first access point and the second wireless modem comprises a second beam adapter for adaptively steering the second main beam towards the first access point.

According to an optional feature of the invention, the first access point comprises an electronically steerable beamforming directional antenna arranged to steer beams towards the first wireless modem and the second wireless modem.

According to an optional feature of the invention, the first main beam and the second main beam are formed in substantially the same direction when the vehicle is far from the first access point.

According to an optional feature of the invention, the substantially same direction is aligned with a direction of movement of the vehicle.

The first main beam and the second main beam may be formed substantially in the direction of movement and/or substantially in the opposite direction of the direction of movement. The direction of the first and second main beams may be substantially in the forwards direction/towards the front of the vehicle. The direction of the first and second main beams may be substantially in the backwards direction/towards the back of the vehicle.

According to an aspect of the invention there is provided an apparatus for a communication system for supporting communication between an end node of a vehicle and a remote correspondent node via a fixed network, the communication system comprising: a plurality of wireless access points of the fixed network including at least a first access point having a directional antenna arrangement for mm wave radio communication using directional beams; a first wireless modem for establishing a first mm wave radio communication link to the first access point supporting communication between the end node of a vehicle and the remote correspondent node, the first wireless modem being located on the vehicle and employing a first electronically steerable beamforming directional antenna having a first main beam for establishing the first mm wave radio communication link; a second wireless modem for establishing a second mm wave radio communication link to the first access point supporting communication between the end node of a vehicle and the remote correspondent node, the second wireless modem being located on the vehicle and employing a second electronically steerable beamforming directional antenna having a second main beam for establishing the second mm wave radio communication link; and the apparatus comprising: a proximity detector for detecting a proximity of the first wireless modem to the first access point; and a switch controller for switching data of a data flow from the first mm wave radio communication link to the second mm wave radio communication link in response to the detection of the proximity of the first wireless modem to the first access point.

According to an aspect of the invention there is provided a method of operation for a communication system supporting communication between an end node of a vehicle and a remote correspondent node via a fixed network, the communication system comprising: a plurality of wireless access points of the fixed network including at least a first access point having a directional antenna arrangement for mm wave radio communication using directional beams; a first wireless modem for establishing a first mm wave radio communication link to the first access point supporting communication between the end node of a vehicle and the remote correspondent node, the first wireless modem being located on the vehicle and employing a first electronically steerable beamforming directional antenna having a first main beam for establishing the first mm wave radio communication link; a second wireless modem for establishing a second mm wave radio communication link to the first access point supporting communication between the end node of a vehicle and the remote correspondent node, the second wireless modem being located on the vehicle and employing a second electronically steerable beamforming directional antenna having a second main beam for establishing the second mm wave radio communication link; and the method comprising: detecting a proximity of the first wireless modem to the first access point; and switching data of a data flow from the first mm wave radio communication link to the second mm wave radio communication link in response to the detection of the proximity of the first wireless modem to the first access point.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
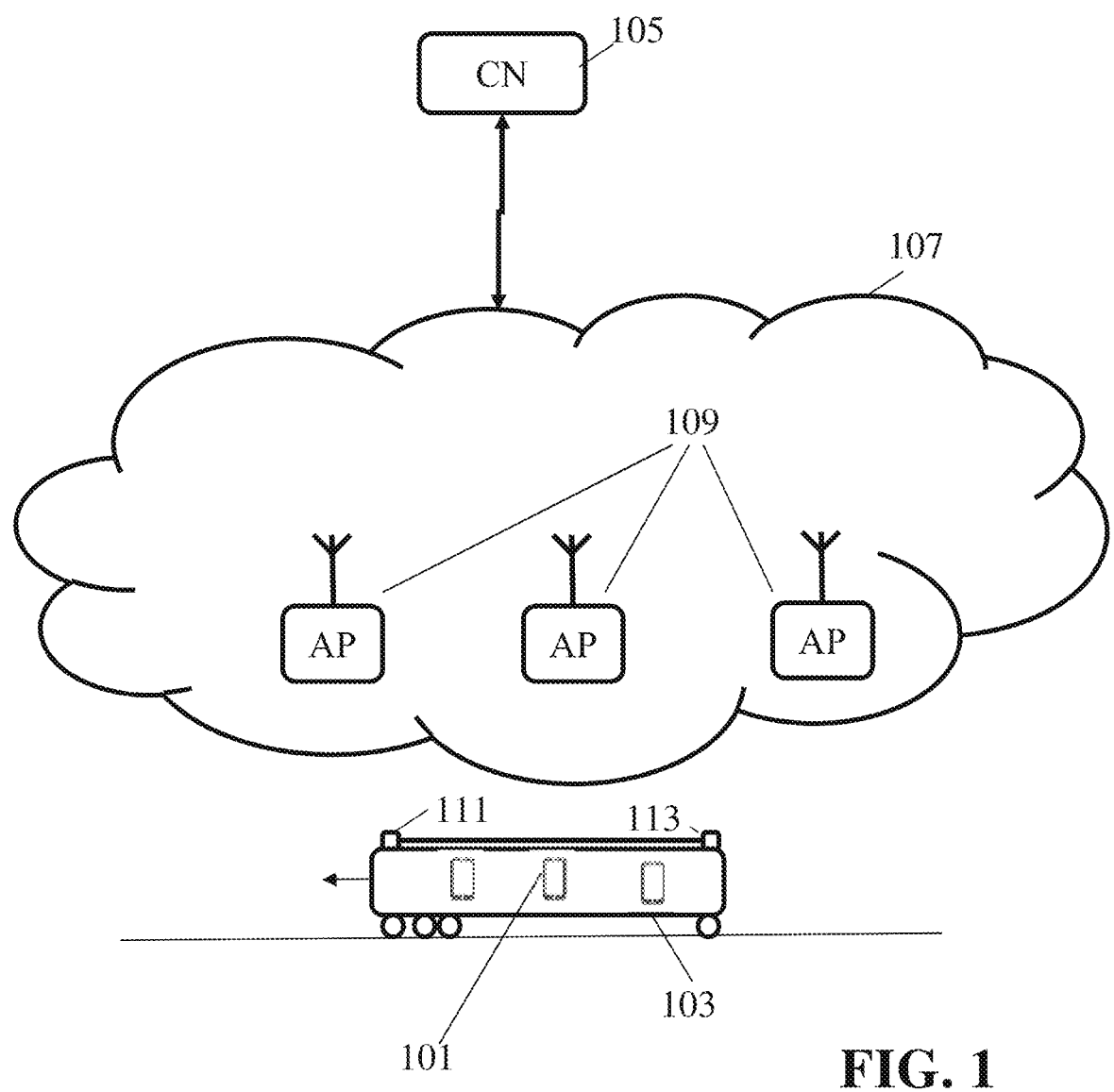
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and trains. The following description will focus on an example in which the vehicle is a train, but it will be appreciated that in other embodiments the end node may be part of other vehicles, such as e.g. a bus driving on a motorway.

In the example of FIG. 1, a communication session is established between a correspondent node 105 and an end node 101 located in a train/vehicle 103. It will be appreciated that references to an entity being at/with/in/on etc. a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/where the movement of the vehicle imparts a movement on the entity.

The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the correspondent node 105 is a web server supporting a web browser on the end node 101 accessing an Internet site supported by the web server of the corresponding node 105.

The communication session is supported by a fixed network 107 which may specifically be a complex network comprising routers, switches, management nodes, mobility controllers, modems etc. as will be known to the skilled person. In the example, the fixed network 107 is a Wide Area Network, WAN, based on the Internet Protocol (IP).

The correspondent node 105 is coupled to the fixed network 107 through a communication connection which supports the communication session with the end node 101. The communication connection is in the example an IP connection and may be established using any suitable means, such as e.g. by a direct connection of a device comprising the corresponding node 105 to a node of the fixed network or e.g. it may be a connection which is provided by a network coupled to both the fixed network 107 and the corresponding node 105. The network may in particular be the Internet, and the coupling of the correspondent node 105 to the fixed network 107 may be via an Internet connection. It will also be appreciated that the fixed network 107 itself may be considered fully or partially part of the Internet.

The coupling of the fixed network 107 to nodes on the train 103 is supported by wireless radio communication links. For this purpose, the fixed network 107 comprises a plurality of wireless access points 109 which in the specific example may be a relatively large number of stationary access points positioned along the train tracks.

Correspondingly, the train/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc.) the train and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication may be used. For example, the wireless links may be formed by radio communications using the 60 GHz frequency band. mm wave communications may specifically be communication in the 20 GHz to 300 GHz frequency range.

The wireless modems 111, 113 are individual nodes in the network configuration and have individual MAC addresses. Data packets can be addressed to the individual modems by other network entities, such as routers or switches, using the individual MAC addresses. A communication link is established from an access point 109 to a wireless modem 111 using the MAC addresses of the AP 109 and the modem 111, and similarly for a link to modem 113 but using the MAC address of modem 113. In the specific embodiment of using the IEEE 802.11ad wireless technology, the AP and the two modems would form a BSS (basic service set). In the specific embodiment of a 3GPP 5G NR radio technology the AP would be known as a base station (a sector of a gNB) and the modems would be known as UEs, with the three devices forming a cell. A scheduler may accordingly allocate data packets to an individual link by associating them with the appropriate MAC address.

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a train, the coverage from each access points 109 may practically be restricted to e.g. around 300 m to 1 km from the access points 109. Accordingly, the distance between access points 109 will tend to be relatively small with the result that a relatively large number of access points 109 will be employed. For example, along a railway track, access points may be distributed for each, e.g. 500 m–1 km of track.

As a consequence, the radio conditions will tend to change quickly for the wireless modems 111, 113, and specifically the optimum access points 109 to which to connect tend to change quickly, e.g. for a train moving along train tracks at a potentially high speed. Furthermore, the directional radio beam of the wireless modems 111, 113 cannot necessarily be steered over all directions, but is limited to e.g. a 90 degree range in the horizontal (azimuth) plane. In order to support such scenarios, the system supports handovers between different access points 109 such that a connection from an end node 101 to the fixed network 107 (and the correspondent node 105) can be sequentially supported by different access points 109 and modems 111, 113 as the vehicle/train 103 moves. In order to maximize the separation of the access points, an individual modem can lose connectivity for significant periods of time (for example, it may only be connected to an AP for approximately half of the time), but the connectivity to the vehicle from at least one modem at any one point in time can be maintained.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and, in particular, in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle, such as specifically for end nodes that are comprised in e.g. handheld devices of passengers on a fast moving train. The approach will be described in more detail with reference to FIG. 2 which shows an example of a specific scenario of FIG. 1 in which an end node 101 in a train 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

Figure 2:
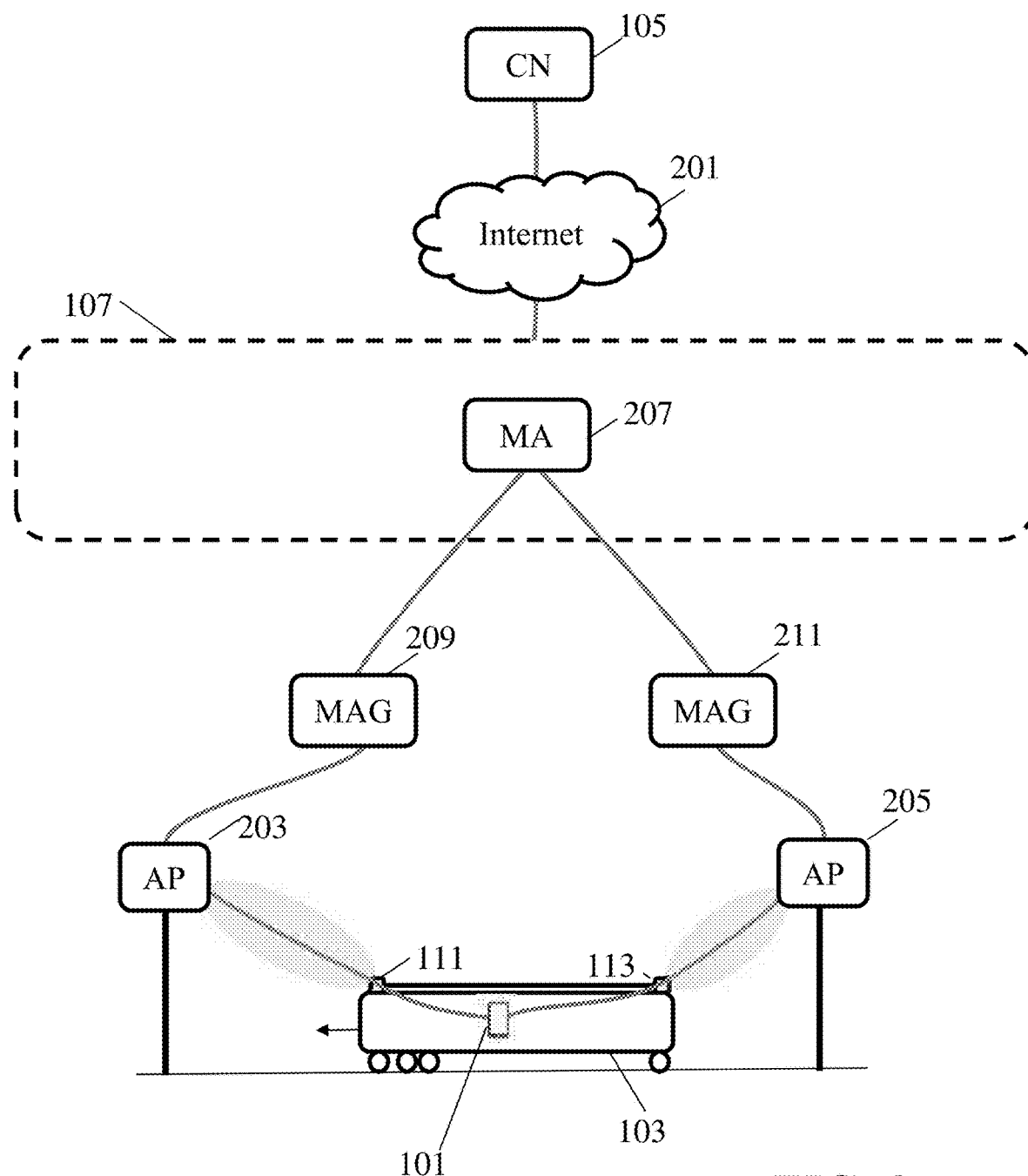
FIG. 2 illustrates an example of elements of a wireless communication system in accordance with some embodiments of the invention.

FIG. 2 illustrates a specific situation in which the train 103 has simultaneous access to a first access point 203 and a second access point 205 of the access points 109 via first and second wireless modems of the wireless modems 111, 113. In the specific situation, a first wireless modem 111 has established a wireless link with the first access point 203 and the second wireless modem 113 has established a wireless link with the second access point 205.

The end node 101 and corresponding node 103 have established a communication session which is supported by the fixed network 107. For example, the correspondent node 105 may operate a web server providing a web service to a client running on a device implementing the end node 101. As a specific example, a passenger on the train may operate a web browsing application which operates a web browsing client that initiates and supports a web service provided by the correspondent node 105.

The fixed network 107 provides connections that can be used by the client and the server. In order to support the mobility of the fast moving train, the fixed network 107 comprises a mobility anchor (MA) 207 which operates as a fixed anchor for the mobile nodes of the train 103. Specifically, the mobility anchor 207 operates as a common fixed anchor in the fixed network 107 for all the wireless modems 111, 113 of the train 103.

The mobility anchor 207 may provide a common node for all connections and communication paths from the correspondent node 105 to the end node 101 regardless of which of the access points 109 and wireless modems 111, 113 support the communication.

Accordingly, all data from the correspondent node 105 to the end node 101 for the communication session may be routed via the mobility anchor 207 regardless of the wireless link that is used on the air interface between the access points 109 and the train. This may for example be achieved by the mobility anchor 207 advertising that it is a mobility anchor 207 for the wireless modems 111, 113 (or other nodes on the train 103) such that any datagrams addressed to any of these nodes will be routed to the mobility anchor 207.

Similarly, all data from the end node 101 to the correspondent node 105 for the communication session may be routed via the mobility anchor 207 regardless of the wireless link that is used on the air interface between the access points 109 and the train 103.

The system may accordingly operate a mobility anchor functionality which provides a fixed anchor point for the mobile nodes of the train 103. The mobility anchor 207 will perform mobility management which includes keeping track of which access points 109 the wireless modems 111, 113 are currently connected to, and updating the routing path for the individual wireless modems 111, 113 and the end node 101 when conditions change. Thus, when the train moves and the individual modems dynamically switch/handover to different access points 109, the mobility anchor 207 will register the resulting changes and update the communication path for the individual connection/flow.

In the example of FIG. 2, each of the access points 203, 205 is coupled to a mobile access gateway 209, 211. Each mobile access gateway 209, 211 is typically linked with a plurality but not all of the access points 209, 211.

The mobility anchor 207 is accordingly a common mobility anchor for a plurality of the wireless modems 111, 113 of the train 103, and typically for all of the wireless modems 111, 113.

In many practical systems, some or all of the access points 109 may be substantially colocated and coupled together through network entities that allow short routing paths between them.

Figure 3:
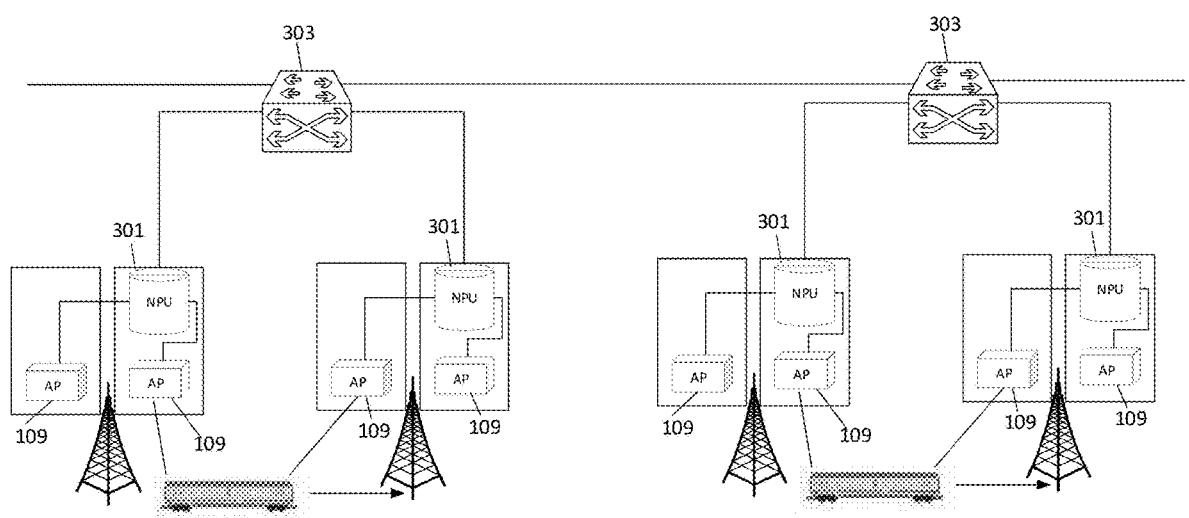
FIG. 3 illustrates an example of elements of a wireless communication system in accordance with some embodiments of the invention.

In many embodiments, such as e.g. illustrated by FIG. 3, two access points 109 may typically be colocated (e.g. on the same mast) with directional beams being used to provide coverage in different, and typically opposite directions. Thus, the access points 109 may comprise a directional antenna arrangement which forms directional beams to support the mm wave radio communications. In some embodiments, the directional antenna arrangement may be arranged to dynamically beam form and steer beams towards wireless modems on the vehicle, i.e. dynamic beam adaptation and steering may be employed. In other embodiments, the directional antenna arrangement may form static beams that are in a given, typical predetermined direction. For example, for access points next to a train track, a static beam in the direction along the track may be formed.

The colocated access points 109 may often be coupled to each other and the rest of the fixed network 107 by a suitable network entity, such as a Network Processing Unit (NPU 301). The NPU 301 may for example allow easy routing of data from one access point to another, and may control whether data packets are routed between the end node and the fixed network via one or the other of the colocated access points 109. In some embodiments, the NPU 301 may for example implement a MAG functionality.

Further, in many systems, the different access points 109 may be coupled together via switches or routers 303 that e.g. may provide a short and direct routing between access points 109 and NPUs 301. This may often facilitate routing and handovers when the vehicle moves as the required modification of routing can be reduced and localized to a higher degree. In some embodiments, the switches or routers 303 connecting the access points 109 may implement the MAG functionality.

The switches or routers 303 may further connect to the rest of the fixed networks, e.g. through interface routers/switches 305. Alternatively or additionally, MAG functionality may be implemented as part of the interface routers/switches 305.

Figure 4:
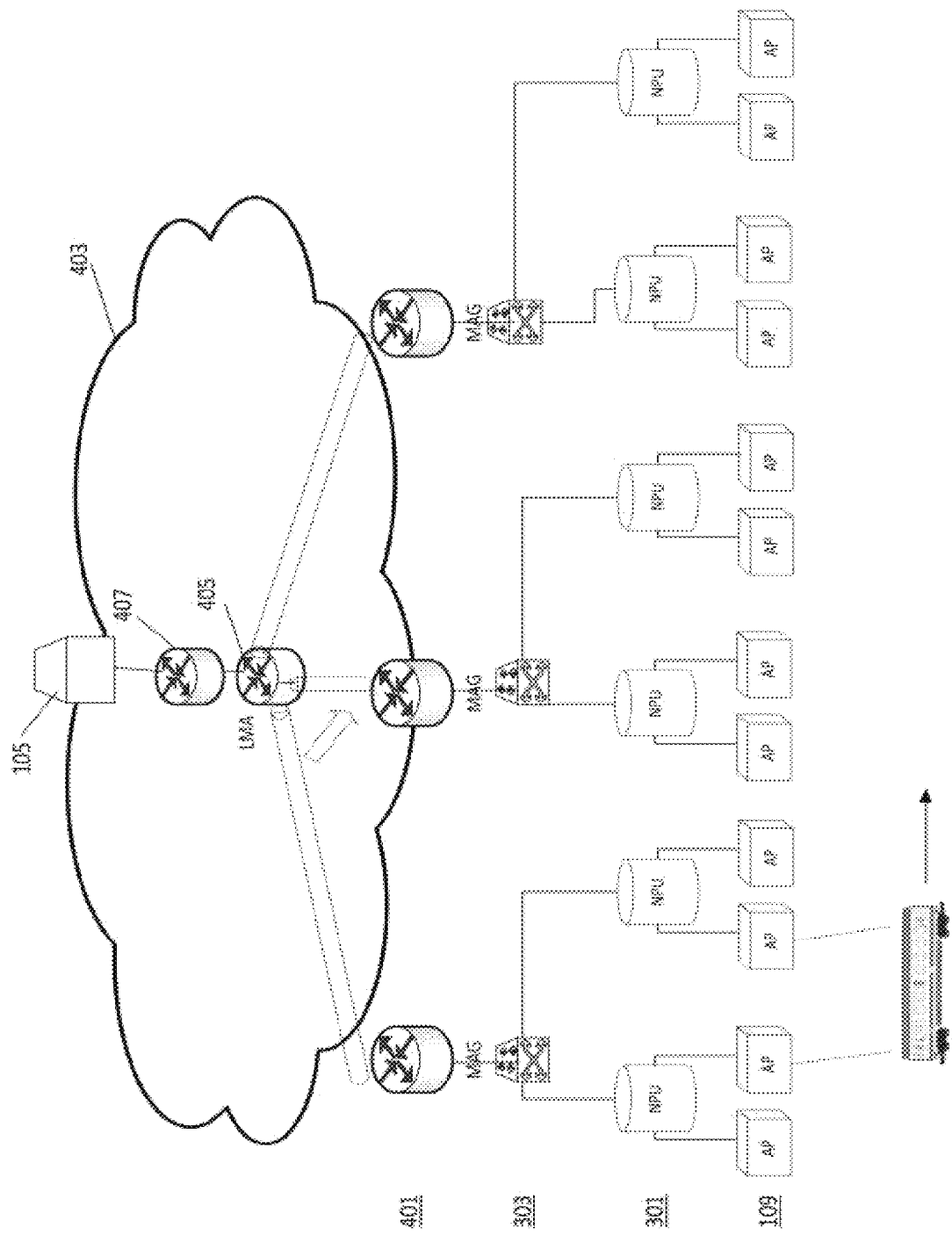
FIG. 4 illustrates an example of elements of a wireless communication system in accordance with some embodiments of the invention.

FIG. 4 illustrates a specific example of a possible network where pairs of access points 109 are colocated and supported by an NPU 301. A plurality of NPUs 301 may be coupled to a network switch 303 which may provide the MAG for that plurality of NPUs 301. Other network switches may support other access points 109 and provide a MAG for those access points 109.

In many embodiments, such a system of access points 109 and supporting network functions (e.g. switches and NPUs) may be proprietary and aimed at a specific scenario, such as supporting a train along a track. Such a proprietary system may accordingly provide a number of interface points with capability of providing a MAG function for the moving vehicle. The system may for example provide a proprietary access network that may be coupled to other networks via suitable interface connections.

For example, each of the interface points may be coupled to an edge router 401 of a core network 403 being part of the fixed network 107. The core network 403 may be a general non-proprietary network such as e.g. the Internet. In some embodiments, the MAG function may be provided in the edge router (or possibly another element of the core network). Another router 405 of the core network 403 may provide a MA function allowing routing of data to and from the MGA as appropriate. The correspondent node 105 may communicate with the MA through a suitable route, typically including a number of routers 407.

In such a system, different functions may be implemented in respectively the proprietary access network and the non-proprietary fixed network. For example, different mobility functions and support may be implemented.

Specifically, the mobility support may be implemented at different network layers and using different protocols. For example, intra MAG mobility may be implemented using layer 2 signaling such as L2 ARP (Data Link Layer-Address Resolution Protocol). This may provide fast and efficient handover between access points 109 under the same MAG, and specifically may allow handovers without requiring any change of routing in the core network (if the MAG is part of the access network).

In contrast, inter MAG mobility may be supported by a higher layer protocol such as for example an IP mobility protocol. Specifically, inter-MAG mobility may be supported by Proxy Mobile Internet Protocol v6 (PMIPv6). This allows the required routing changes in the core network 403 to be implemented efficiently.

Figure 5:
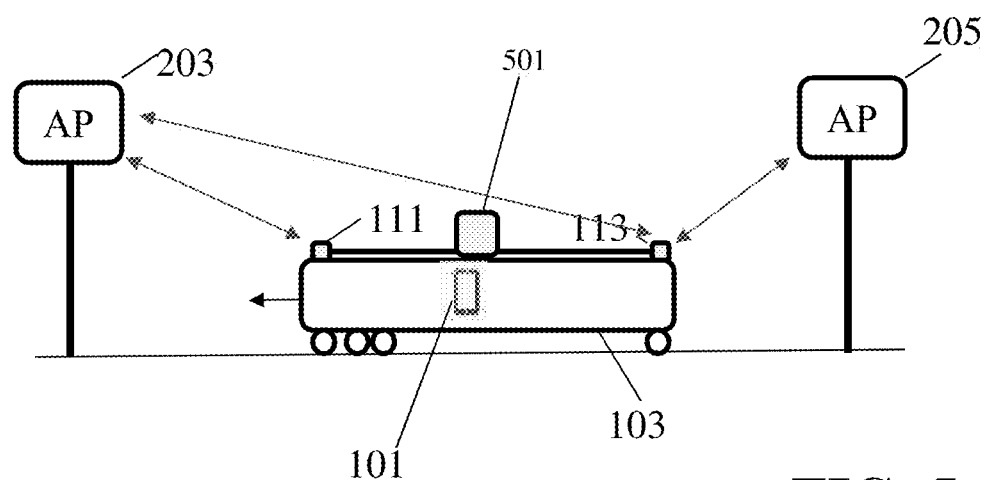
FIG. 5 illustrates an example of elements of a wireless communication system in accordance with some embodiments of the invention.

In some embodiments, the end node 101 may directly be connected to the wireless modems 111, 113 e.g. by a direct wireless link. However, in many embodiments, the wireless modems 111, 113 may as illustrated in FIG. 5 be coupled to a network element 501 or a network through which the connection with the end node 101 is formed.

Figure 6:
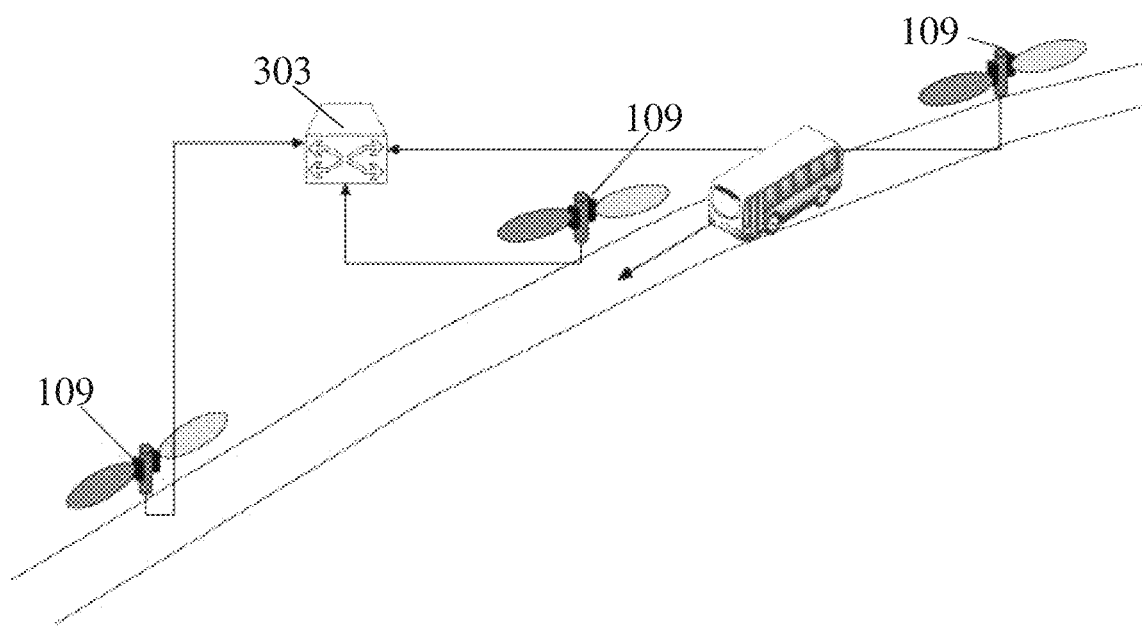
FIG. 6 illustrates an example of elements of a wireless communication system in accordance with some embodiments of the invention.

As previously mentioned, in many systems, the access points 109 may be arranged with a plurality of access points 109 being substantially colocated. For example, often pairs of access points 109 are colocated on a mast along the route covered. The access points 109 may use directional antenna arrangements to provide different coverage areas. For example, as illustrated in FIG. 6, two colocated access points 109 may have directional antenna beams that are substantially in opposite directions, and typically in different directions along the track being covered (e.g. in opposite directions of the track or road being covered).

Thus, some or all of the access points 109 may comprise directional antennas which are arranged to steer beams towards the wireless modems of the vehicle. In some embodiments, a static beam forming may be used with the beam formed being constant in a given direction. For example, one access point 109 may permanently direct a beam down a track and another colocated access point 109 may permanently direct a beam up the track in the other direction. A vehicle downstream from the position may then be connected via a wireless link with the first access point 109 and a vehicle upstream from the position may then be connected via a wireless link with the second access point 109.

In many embodiments, the access points 109 may be arranged to dynamically and electronically steer the beams, and specifically may be arranged to steer them towards respectively the wireless modems. A beam may indeed by steered individually for each wireless link and may dynamically be updated to be directed towards the wireless modem supporting the link. The updating may for example be by updating antenna array coefficients in response to received parameters as well known in the art.

Figure 7:
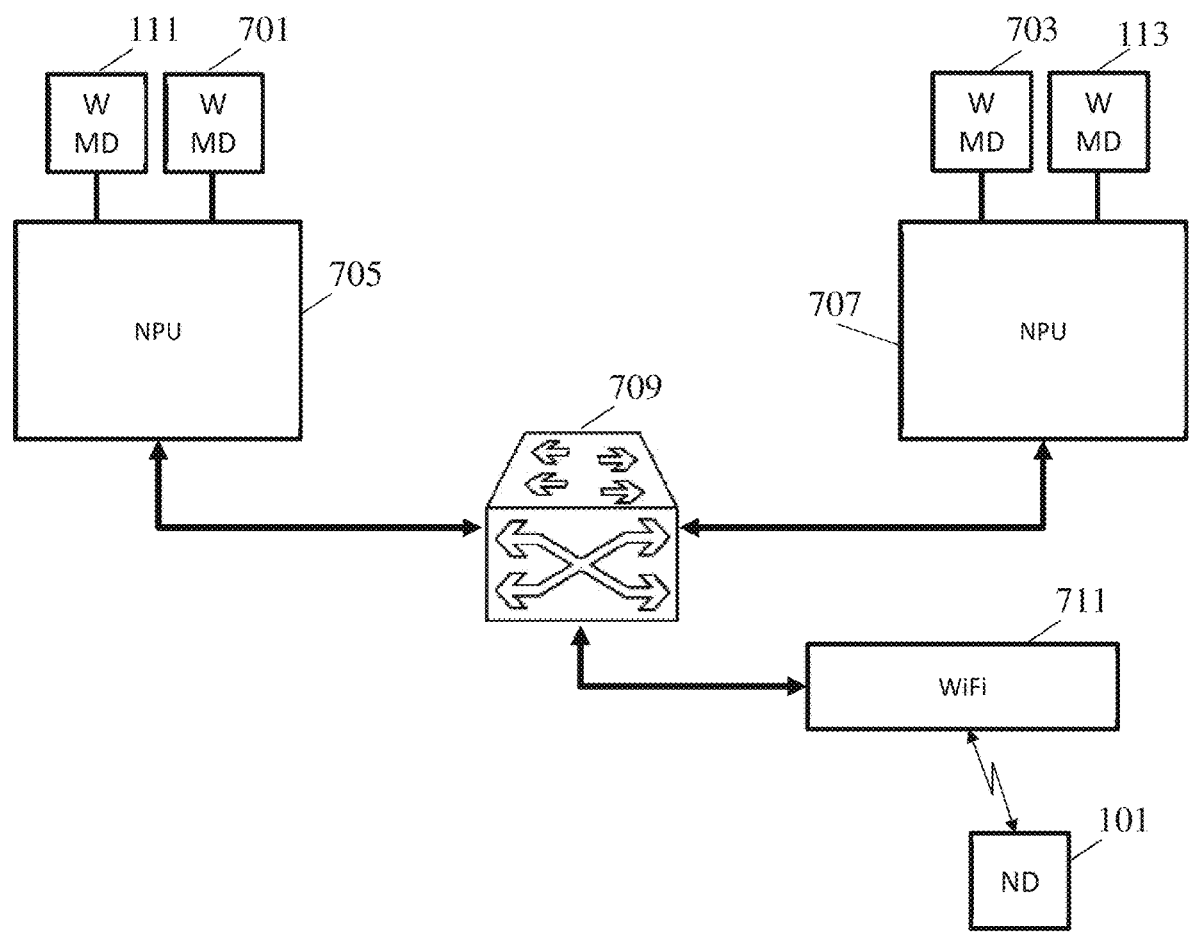
FIG. 7 illustrates an example of elements of a vehicle based network subsystem of a wireless communication system in accordance with some embodiments of the invention.

As illustrated in FIG. 7, a moving vehicle may comprise four wireless modems 111, 113, 701, 703 being arranged into colocated pairs with one pair 111, 701 being towards the front of the vehicle and the other pair 113, 703 being located towards the rear of the vehicle.

The first pair of wireless modems 111, 701 are coupled to a first NPU 705 and the second pair of wireless modems 113, 703 are coupled to a second NPU 707. The NPUs 705, 707 are coupled to a switch 709 which is further coupled to a Wi-Fi subsystem 711. The NPUs 705, 707 and WiFi subsystem 711 may specifically be coupled to the switch 709 via Ethernet connections and the switch 709 may be an Ethernet switch. The WiFi subsystem 711 may e.g. provide wireless WiFi access throughout the vehicle, such as throughout a train, and may itself comprise WiFi access points, routers etc. Thus, a user of the end node 101 may simply connect to a local WiFi subsystem 711 (and specifically a conventional WiFi access point) to access the core network and the correspondent node 105. The WiFi subsystem 711 may for example be a conventional WiFi system such as an IEEE 802ac (or earlier) system. Thus, a user on a moving vehicle, such as a train, may simply access a conventional local WiFi access point to gain Internet access.

In the system described, at least two of the wireless modems employ electronically steerable beamforming directional antenna that form a beam, and more specifically that form a directional pattern having a main beam that can be steered. Further, the (at least) two wireless modems employ directional antennas that may form a beam substantially in the same direction. Typically, all wireless modems form directional beams.

E.g., in the example of FIG. 7, the two co-located wireless modems 111, 701 may employ electronically steerable beamforming directional antennas that are directed in substantially opposite directions, specifically in the direction of movement and in the opposite direction of movement, specifically one directional antenna may be directed in the forwards direction of the vehicle and the other being pointed in the backwards direction of movement. Similarly, the other two co-located modems 113, 703 may employ directional antennas that are also directed in opposite directions, specifically in the direction of movement and in the opposite direction (forward/backwards). This may result in two wireless modems 111, 703 having beams formed generally in the forward direction (direction of movement) and two modems 113, 701 having beams formed generally in the backward direction.

In many embodiments, the wireless modems may comprise a beam adapter which is arranged to adaptively steer the main beam of the electronically steerable beamforming directional antenna towards the access point. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam adapter which dynamically is arranged to adapt the individual antenna coefficients to direct the main beam towards the relevant access points, e.g. by applying a beam steering algorithm maximizing the received signal strength or signal to noise ratio as well known in the art. As another example, more mechanical solutions may be used. For example, horn antenna being electronically steerable using a stepper motor with electronic control may be used.

For two wireless modems connected to the same access point, such a steering may automatically and inherently result in the beams being formed in substantially the same direction for at least most locations. Specifically, when the distance between the wireless modems is small compared to the distance to the access point (say at least 5 or 10 times lower), the directions are inherently in substantially in the same direction. This will in most applications be the case for the majority of locations of the vehicle. The beam forming of two wireless modems towards the same point (and specifically access point) will be in substantially the same direction for a distance to the vehicle being at least 5 or 10 times greater than a distance between the wireless modems.

Thus, such an adaptive steering may not only result in improved link quality for the individual link as the beam may be dynamically optimized, but may also inherently ensure that the beams of the different wireless modems are formed in substantially the same direction, and specifically are formed towards the same access point, for most locations of the vehicle.

The wireless modems having beams pointing in the same direction may be suitable for forming wireless links with the same access point 109. For example, the two wireless modems having beams pointing in the forwards direction may both be suitable for establishing a wireless link with an access point 109 further ahead along the route/track. Similarly, the two wireless modems having beams pointing in the backwards direction may both be suitable for establishing a wireless link with an access point 109 being further backwards along the tracks.

Thus, the vehicle, such as a train or a bus, may thus comprise at least a first wireless modem 111 and a second aligned wireless modem 703 which are arranged to establish respectively a first and a second mm wave radio communication link to the same access point. For brevity, conciseness and clarity, modems having the beams formed in substantially the same direction will be referred to as aligned wireless modems and the description will focus on a vehicle comprising a pair of aligned wireless modems having forward facing beams and a pair of aligned modems having rearward facing beams. Beams and radio communication links from different wireless modems to the same access point will also be referred to as aligned beams and aligned radio communication links.

Aligned wireless modems will typically be at a distance with respect to each other. In many embodiments, the distance between at least two aligned wireless modems of the vehicle will be no less than 5 m, 10 m, 20 m, 50 m, or even 100 m. In many embodiments, at least two aligned wireless modems will be disposed towards opposite ends of the vehicle, for example at the front and back of a bus or on respectively the first and last carriage of a train. Thus, at least two aligned wireless modems will be positioned proximal to opposite ends of the vehicle.

In many embodiments, the distance between at least two aligned wireless modems may be no less than 5, 10, or 100 times greater than a distance from each of the two aligned wireless modems to the nearest of the front and of the back of the vehicle. Thus, in many embodiments, the distance between at least two aligned wireless modems may be no less than 5, 10, or 100 times greater than a distance from the front of the vehicle to the nearest of the two aligned wireless modems. Similarly, in many embodiments, the distance between at least two aligned wireless modems may be no less than 5, 10, or 100 times higher than a distance from the back of the vehicle to the nearest of the two aligned wireless modems.

In contrast to the aligned wireless modems, non-aligned aligned wireless modems may often be positioned close to each other and specifically may typically be positioned such that a pair (or set) of non-aligned aligned wireless modems are substantially co-located. For example, in the specific embodiment described, a pair of forward facing aligned wireless modems are positioned at respectively the front and back of the vehicle, and similarly a pair of rearward facing aligned wireless modems are positioned at respectively the front and back of the vehicle. Further, the forward and backwards facing wireless modems at the front of the vehicle may be substantially co-located, and the forward and rearward facing wireless modems at the rear of the vehicle may be substantially co-located. This colocation may facilitate operation and specifically allow shared network functionality, such as e.g. the colocated non-aligned wireless modems sharing a common NPU for coupling to e.g. an Ethernet switch.

The aligned wireless modems are accordingly at a substantial distance to each other. As the beams are in the same direction, all aligned modems may potentially connect to the same access point and thus multiple wireless communication links may be set up from the vehicle/train to a given access point. Further, due to the distance between the aligned wireless modems, the properties of the wireless links will typically be substantially different and will vary in different ways. Indeed, even in scenarios where the average propagation characteristics to different aligned wireless modems is substantially the same (e.g. the vehicle is far from the access point), the instantaneous conditions may be very different and vary in a typically independent and substantially uncorrelated way. The performance of the individual links will differ because of difference in path loss and fading (fast fading or shadowing) and radio and antenna performance.

In the described system, multiple simultaneous mm wave radio communication links may be set up to a set of aligned wireless modems and a data flow to a specific end node 101 on the vehicle may be able to use such multiple simultaneous links.

Specifically, the system may comprise a scheduler which is arranged to schedule data of a communication for an end node over the wireless radio air interface. Such a scheduler may be arranged to schedule data from and/or to the end node using the multiple radio communication links. The scheduling over the air interface may schedule data over the multiple radio communication links based on the link quality for the individual communication links.

Figure 8:
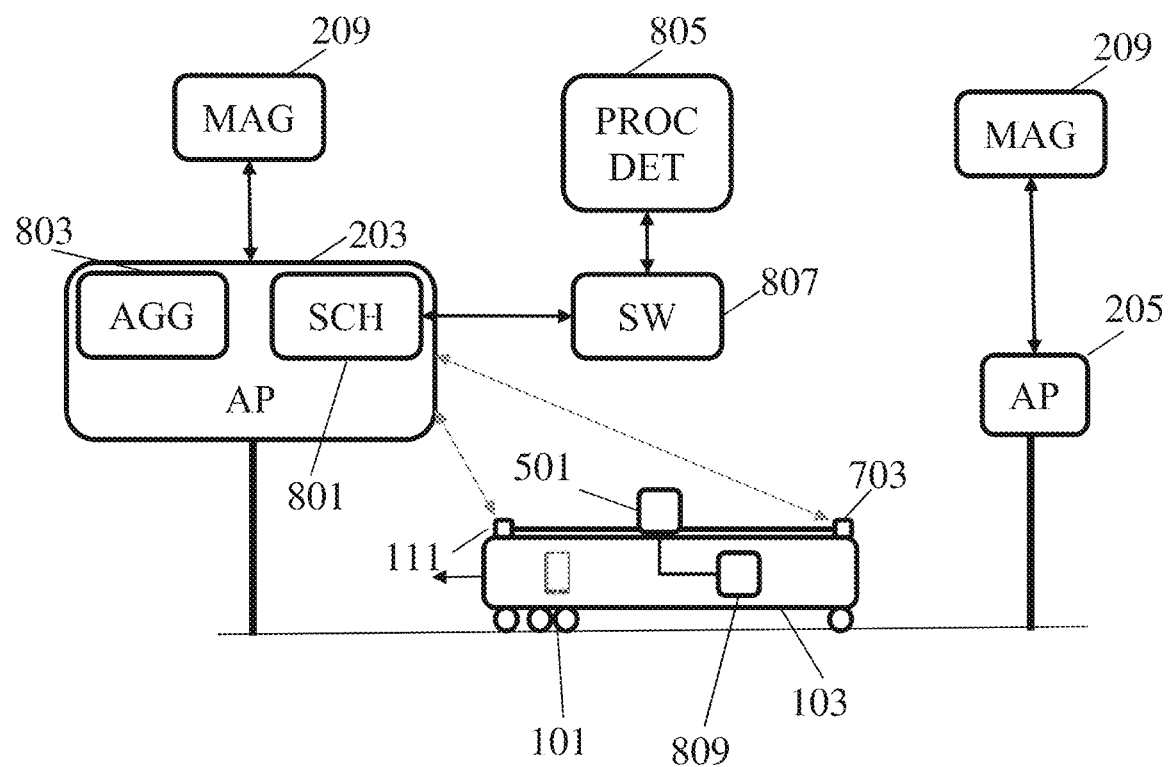
FIG. 8 illustrates an example of elements of a vehicle based network subsystem of a wireless communication system in accordance with some embodiments of the invention.

For example, as shown in FIG. 8, the scheduler 801 may be part of an access point 203, and indeed each access point may comprise a corresponding radio link scheduler arranged to schedule data communication over the air interface of that access point. In many embodiments, the scheduler 801 may be considered to be part of an aggregator 803 which will be described further later.

The scheduler 801 may allocate time slots and/or frequency channels to data to be communicated to or from the vehicle. For example, the wireless air interface between access points and wireless modems may be based on mm wave communication such as the IEEE 802.11ad using communications in the 60 GHz band. Each base station may be assigned a single frequency channel which may be the same or different from the frequency channel of a colocated access point. The use of a different channel may reduce the modem to modem interference when the vehicle is located astride the mast supporting the co-located access points. For example, for a system supporting communication on a train, a first frequency channel may be assigned to all upstream facing access points and a second frequency channel may be assigned to all downstream facing access points. In this case, the downlink and uplink interference impacting the radio links may typically be relatively low for most locations along the track.

Within a given frequency channel assigned to an access point, individual data may be scheduled in time allocations. Specifically, the scheduling may be performed in scheduling intervals where each scheduling interval comprises a plurality of time allocations which may be allocated to specific communications and for communication of specific data packets. The time allocations may be allocated to uplink or downlink traffic, i.e. to communication to or from the access points. The time allocations may be of variable or fixed duration (also known as slotted). The system may thus use Time Division Duplex (TDD) to share the air interface resource.

Further, in many embodiments, an access point may use Time Division Multiple Access (TDMA) to communicate with a plurality of wireless modems. Thus, different time allocations may be allocated to communication to different aligned wireless modems.

Further, in some embodiments, the air interface communication may use OFDM (Orthogonal Frequency Division Multiplexing) and the scheduling of data may further take this into account. For example, different OFDM channels may be allocated to different communications.

Thus, the scheduler 801 may be arranged to schedule data for communication over the air interface between the access point 203 and a plurality of aligned wireless modems 111, 703. Accordingly, the use of wireless modems with aligned beams on the vehicle may provide multiple possible paths to end nodes on the vehicle from a given access point and in the system this may be exploited to provide improved communication and overall performance.

Specifically, a scheduler 801 for an access point may support an ongoing communication from and end node 101 to a correspondent node 105. For example, an end to end flow may be setup between an end node 101 accessing an Internet service from the vehicle and a correspondent node 105 in the form of a server supporting the internet service. Routing of data for the end to end flow may be based on the fixed network implementing MA and MAGs to update routing tables etc. as illustrated in and described with respect to FIG. 1.

In such a system, the route for data packets of the flow may include a first access point 203 for which multiple mm wave radio communication links are established with aligned wireless modems of the modem.

Thus, for the data packets/datagrams routed via the first access point 203, there are multiple options for connecting to the network subsystem of the vehicle. A scheduler 801 which may in many embodiments be part of the first access point 203 is arranged to schedule the data packets over the air interface. The scheduler 801 is specifically arranged to schedule data packets for or to the vehicle network subsystem, and thus for the end node 101, over both the first radio communication link and the second radio communication link, with the scheduling being based on the link quality for respectively the first and second radio communication links.

The scheduler may be arranged to bias data for communication towards radio communication links having a higher link quality. For example, if the current conditions indicate that the link quality for the first radio communication link is substantially higher than the link quality for the second radio communication link, the scheduler may schedule a higher proportion of data packets for the first radio communication link than for the second radio communication link. If the conditions change to a situation where the link qualities are approximately the same, the scheduler may proceed to schedule data packets for communication over both of the radio communication links with roughly the same amount of data being transmitted over each of the links. If the conditions continue to change such that the second radio communication link experiences a higher link quality, the scheduler may proceed to bias data packets to be scheduled on the second radio communication link.

It will be appreciated that many means and approaches for determining link qualities of radio communication links are known and that any suitable approach may be used. For example, in many embodiments, the wireless modems or the access points may continuously measure the current block error rate and use this as a link quality indication. In other embodiments, a number of retransmissions of a retransmission protocol may be monitored and used to determine a link quality indicator. Alternatively or additionally, a signal to noise ratio may be estimated and used as a quality indication. The modulation and coding scheme (MCS) determined by the access points and/or modems could also be used. The sustainable data rate or spectrum efficiency could also be used. In many embodiments, a plurality of parameters may be measured and combined into a link quality indicator.

It will also be appreciated that link quality indications may be determined in different elements of the network, such as specifically by the wireless modems or the access points, and that the link quality indications (or measurements used to determine these) may be communicated to a suitable destination for processing. Specifically, the indications and measurements may in many embodiments be communicated directly to the scheduler.

In the described embodiment, the scheduler is implemented in an access point. This may provide a number of advantages, and may e.g. provide a facilitated and localized scheduling. It may further allow scheduling to quickly adapt to changes in conditions, such as changes in the link conditions or to variations in amount of data to be communicated.

However, in other embodiments, the scheduler may be positioned elsewhere in the fixed network, such as e.g. being located at a router also providing the MAG function or a switch or in a server.

In many embodiments, a scheduler may be implemented as part of the vehicle subnetwork. For example, the wireless modems or often the network element 501 e.g. providing a routing point for all wireless modems of the vehicle may also implement a scheduler which can schedule data to be communicated over a specific one of a set of aligned wireless modems.

In many embodiments, such an approach may provide improved operation since the modems are able to measure the strength or quality of the downlink radio links and make a rapid decision on how to balance data traffic between the available radio links to the single AP. The selection or load balancing used by the modems on the uplink may be inferred by the AP to represent the relative qualities of the radio links and to steer how it schedules traffic on the downlink.

In the system, the aligned wireless modems have different MAC addresses. Thus, the end to end flow routing may be based on IP addresses, and the correspondent node 105 and end node 101 may be associated with IP addresses that are valid throughout the system and which are common for all routes between the nodes. The specific routing over the air interface and specifically which radio communication link of aligned wireless modems that is used for specific data packets may be controlled by use of the MAC addresses of the individual aligned wireless modems. Specifically, the scheduler may be arranged to schedule data for the end node by selecting different intermediate modem MAC addresses for data packets addressed to the end node. In a wireless LAN or in a cell of a cellular communications system, the air interface is shared using TDMA, FDMA or CDMA, or some combination thereof. A scheduler issues grants to allocate the air interface to different mobile stations, with identification via a MAC address or terminal identifier. After receiving a grant addressed to itself, the mobile station or terminal knows how and when it should transmit and receive. In most wireless technologies a framing structure is applied with periodic transmission of broadcast channels by the access point or base station. The frame includes multiple grants and multiple transmission intervals.

In more detail, in the embodiment of an IEEE 802.11ad wireless deployment, the access point and the aligned modems form a BSS. The TDMA operation shares the air time between the possible downlink and uplink links according to service periods granted by the access point. During a service period typically there is one transmitter and one receiver assigned. Service periods assignments include the MAC addresses of the allocated devices. IEEE 802.11ad operates with a framing structure based on the beacon interval. During a beacon interval there are beacon transmissions by the access point, followed by a number of service periods. When there is a BSS with an AP plus two modems, given queued traffic at all devices, there could be service periods for all of the four possible transmitter and receiver combinations. IEEE 802.11ad also supports dynamic scheduling in which service periods are allocated on demand. In a 3GPP deployment, the modems would be known as UEs and the access point as a gNB.

In many embodiments, an access point having a plurality of mm wave radio communication links to aligned wireless modems may communicate data for the end node over a plurality of the mm wave radio communication links (also henceforth referred to as aligned radio communication links). The communication may be fully simultaneous or may be simultaneous in the sense that it is within the same scheduling interval, i.e. a given scheduling interval may comprise communication of data to or from the end node 101 over a plurality of the aligned radio communication links.

The scheduler 801 may thus be arranged to schedule, within the same scheduling interval, first data for the end node for transmission over a first mm wave radio communication link and second data for the end node for transmission over a second mm wave radio communication link. In this way multiple paths may be utilized over the air interface for a single access point resulting in more efficient and improved support of the end node 101.

The availability of multiple wireless modems located at a spatial distance on the vehicle provides substantial advantages in allowing a more flexible and efficient communication. Specifically, spatial diversity can be exploited to improve communication efficiency and reliability. Specifically, the scheduler considering radio link quality may result in a more reliable and efficient air interface communication.

However, due to the often fast changing radio propagation conditions for the wireless links, the communication/scheduling must be carefully managed and adapted to match the potentially very fast dynamic changes.

The system described in the following specifically comprises functionality for detecting that a given wireless modem is proximal (in accordance with a suitable proximity criterion) to an access point (in accordance with a suitable proximity criterion), and in response to such a detection it is arranged to switch data of a data flow for an end node from the radio communication link to this wireless modem to another communication link from the same access point but to a different wireless modem that is more distant from the access point. Thus, in contrast to conventional approaches where communication is typically biased towards the access point and wireless modem link that has the shortest distance and thus typically lowest average propagation loss, the current mm wave radio communication system may in some scenarios bias the communication away from such a link towards a link for which the wireless modem is further from the access point.

The Inventors have in particular realized that in mm wave radio communication systems using beamforming techniques to support potentially fast moving vehicles, it is in many scenarios advantageous to bias communication away from wireless modems that are very close to an access point if more distant wireless modems are available for the access point. The Inventors have in particular realized that implementing proximity detection and using this to bias communication away from very close wireless modems may in many scenarios provide improved overall performance and reliability when supporting communication from vehicles such as cars, trucks, trains etc. using mm wave radio communication with beamforming.

Accordingly, the system of FIG. 8 comprises a proximity detector 805 which is arranged to detect a proximity of the first wireless modem 111 to the access point, and a switch controller 807 for switching data of a data flow from a first mm wave radio communication link between the access point 203 and the first wireless modem 111 to a second mm wave radio communication link from the access point 203 and a second aligned (beams formed in substantially the same direction) wireless modem 703 in response to the proximity detector 805 detecting the proximity of the first wireless modem 111 to the access point 203.

Thus, the proximity detector 805 may continuously determine a proximity or distance estimate from the first access point 203 to the first wireless modem 111 and if this indicates that a given proximity criterion is met, it may inform the switch controller 807 of this proximity detection. In response, the switch controller 807 may for example control the scheduler 801 to switch a data flow from being communicated to the end node 105 via the first mm wave radio communication link to the first wireless modem 111 to e.g. be communicated to the end node 105 via the second mm wave radio communication link to the second aligned wireless modem 703.

Figure 9:
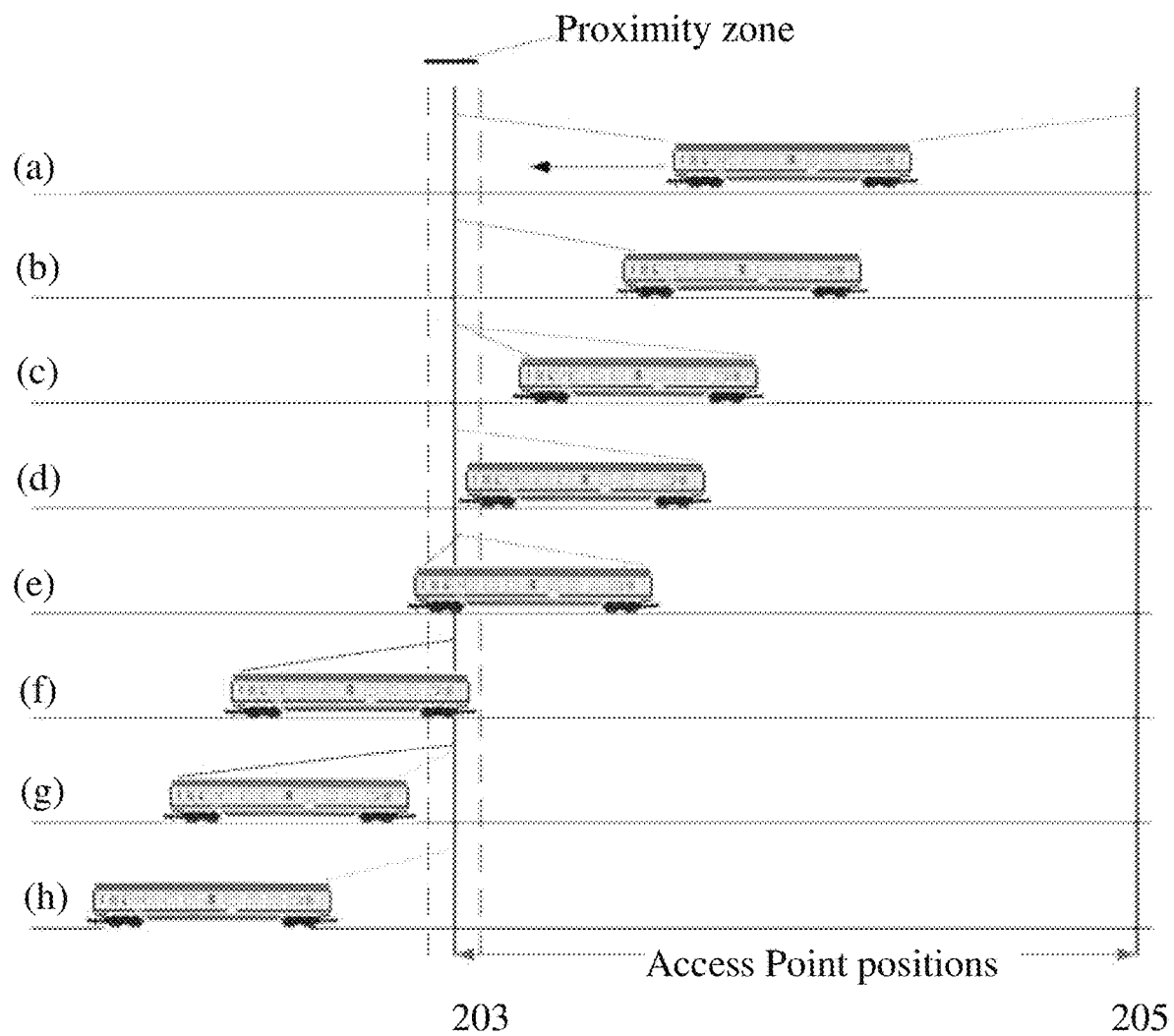
FIG. 9 illustrates an example of a scenario in which a vehicle passes close by an access point.

The approach may be elucidated by a specific example where a vehicle in the form of a train is travelling along a set of tracks as illustrated in FIG. 9. The train is travelling from the right towards the left and comprises wireless modems for communicating with access points along the track. Thus, the scenario may be compatible with the previous description and figures.

The example illustrates a situation (a) where the train is first positioned at a position between the first access point 203 and the second access point 205 where it is possible to form mm wave radio communication links from the train to both access points 203, 205. At this stage, a first mm wave radio communication link is formed from the first wireless modem 111 to the first access point 203 and from the non-aligned (second) wireless modem 113 to the second access point 205.

At a later point (b), the train is too far from the second access point 205 and the mm wave radio communication link from the non-aligned (second) wireless modem 113 to the second access point 205 is dropped and only a first mm wave radio communication link to the first access point 203 from the first wireless modem 111 is available. Thus, all data to the end node 105 is in this case communicated over the first mm wave radio communication link formed to the first wireless modem 111 positioned on the front of the train.

Following this, as the train approaches the first access point 203, a second mm wave radio communication link may be set up between the first access point 203 and the second aligned wireless modem 703 positioned at the rear of the train leading to situation (c) where there are two parallel mm wave radio communication links between the first access point 203 and the train. At this stage, data of the data flow for the end node 105 (in potentially both directions) may be scheduled over both mm wave radio communication links, i.e. via both the first wireless modem 111 and the second aligned wireless modem 703.

As the train approaches the first access point 203 (*d*), the proximity detector 805 may detect that the train reaches a proximity region 901 around the first access point 203, i.e. the proximity detector 805 detects that the train and the first wireless modem 111 is proximal to the first access point 203 (in accordance with any suitable criterion).

In response, the switch controller 807 may proceed to switch the data flow from the first mm wave radio communication link to the second mm wave radio communication link, i.e. it will switch the data flow from the first wireless modem 111 to the second aligned wireless modem 703. In the example, no data is communicated over the first mm wave radio communication link, and indeed the first mm wave radio communication link may be dropped completely, and all the data for the end node 105 may be communicated over the second mm wave radio communication link.

Thus, in response to the proximity detection, the system switches a data flow from an air interface communication link with a shorter propagation path to an air interface communication link with a typically longer propagation path.

At some point (e), the proximity detector 805 may detect that the first wireless modem 111 and/or the colocated first wireless modem 701 is no longer proximal to the first access point 203 but that it has left the proximity region (in accordance with any suitable criterion). In response the data flow to/from the end node 105 may now also be over a mm wave radio communication link to one of these modems. Thus, in embodiments where the first wireless modem 111 can support mm wave radio communication link both in forwards and backwards directions, the first mm wave radio communication link (which may have been maintained during the traversing of the proximity zone) may again be used for communicating data. Alternatively, if the mm wave radio communication link was dropped, a new mm wave radio communication link may be set up from the first access point 203 to the first wireless modem 111.

In scenarios where the first wireless modem 111 can only support mm wave radio communication link in the forwards direction (e.g. it can only form beams in the forwards direction), a new first mm wave radio communication link may e.g. be setup with the colocated first wireless modem 701 and used for data of the data flow.

Thus, a situation (e) may occur where again two parallel mm wave radio communication links are used to communicate with the end node 105.

At some point, the second aligned wireless modem 703 enters the proximity region and the proximity detector 805 may detect this and the switch controller 807 may switch data flow from the second mm wave radio communication link to the first mm wave radio communication link, i.e. from the second aligned wireless modem 703 to the first wireless modem 111 (or to the colocated wireless modem if the new first mm wave radio communication link is set up with this wireless modem). Thus, a situation (f) occurs where data flow is only over the first mm wave radio communication link.

When the proximity detector 805 detects that the second aligned wireless modem 703 leaves the proximity region, the data flow may be re-established over the second mm wave radio communication link (either using the second aligned wireless modem 703 (if this is arranged to support mm wave radio communication link both in forwards and backwards directions) or the colocated second wireless modem 113) leading to a situation (g) where the communication with the end node 105 is again supported by two mm wave radio communication links.

As the train moves further away from the first access point 203, it will at some point reach a distance where the first mm wave radio communication link no longer can be supported and accordingly this link is dropped leading to a situation (h) where the communication is supported only by the second mm wave radio communication link.

At some point the train will have moved sufficiently close to the next access point (not shown) so that a new mm wave radio communication link can be established to this access point. Thus, a scenario corresponding to situation (a) occurs with the communication being supported by two mm wave radio communication links with two different access points.

It will be appreciated that in some embodiments the proximity detector 805 may be arranged to detect proximity for only a single wireless modem and the proximity detection and data flow switching by the switch controller 807 may be performed separately for each individual mm wave radio communication link. In other embodiments, a proximity detection for a wireless modem may result in a switching for all mm wave radio communication links supported by that wireless modem.

Also, in some embodiments, the approach may only be applied for one (or a subset) of the wireless modems of the vehicle or may be applied to all wireless modems. The system may for example evaluate and process each wireless modem separately using the same approach for each wireless modem. Thus, the proximity detector 805 may in some embodiments detect proximity only for one wireless modem whereas it in other embodiments may (individually) detect proximity for a plurality of wireless modems. For example, it may be arranged to detect proximity to the first access point 203 for all wireless modems currently having mm wave radio communication links established with the first access point 203.

In many embodiments, the proximity detector 805 and switch controller 807 may be associated with a specific access point. In other embodiments, a more centralized proximity detector 805 and/or switch controller 807 that is common for a plurality of access points may be used. Indeed, the described concept of proximity detection and data flow switching may only be applied for some (or potentially even only one) of the access points.

In some embodiments, the proximity detector 805 and/or switch controller 807 may be specific to the vehicle, and indeed in some embodiments the proximity detector 805 and/or switch controller 807 may be positioned on the vehicle itself. In such cases, the proximity detector 805 and/or switch controller 807 may communicate with the network as required, e.g. in order to cause the data flow to be switched or to communicate that a proximity detection has occurred.

The approach may introduce a proximity zone being an exclusion or dead zone around access points such that communication is biased away from wireless modems that are within this proximity zone. Indeed, in some embodiments, no communication may be performed with wireless modems within the exclusion zone.

The approach may provide substantial advantages in many scenarios and systems based on beamforming and mm wave radio communication for potentially fast moving vehicles.

The Inventors have realized that communication may be degraded or become more difficult in areas close to the access points of such systems. Specifically, the propagation conditions may change very fast with potentially short and deep fades which may be difficult or impossible to accommodate and adapt to. Another significant issue is that for such systems, and in particular as the mm wave radio communication allows for very narrow beams to be used, the optimum directions of the beams change very fast when the wireless modem is close to the access point. In particular, when passing closely by an access point, the optimum beam direction may change so fast that it is not feasible to reliably adapt the main beam to follow the optimal direction. This may apply to both beamforming at the access point and at the wireless modem.

The described approach may address such potential problems by utilizing spatial diversity for wireless modems on the same vehicle.

The exact algorithm and criterion used to determine that proximity has been detected will depend on the specific requirements and preferences of the individual embodiment and application. The proximity detector 805 may be able to detect the proximity of the first wireless modem to the first access point 203 in accordance with a proximity criterion. Any suitable proximity criterion may be used and may e.g. depend on the specific information that is available to the proximity detector 805 and thus may depend on where in the system the proximity detector 805 is located. The proximity may be detected when a proximity criterion reflecting a likelihood that a distance between the first wireless modem 111 and the first access point 203 is below a given threshold.

In many embodiments, the proximity criterion may be adaptive, and may for example depend on the position of the first access point 203 relative to a route for the vehicle. For example, the threshold for detecting the proximity based on a current distance may be dependent on the perpendicular distance from the first access point 203 to the track followed by the vehicle/train.

In the following some specific advantageous approaches for proximity detection will be described but it will be appreciated that the invention is not limited to these examples. It will also be appreciated that the proximity detection may be based on a plurality of these (or other) algorithms including these being alternative requirements or on more than one of these requirements having to be met for a proximity detection to occur.

In some embodiments, the proximity detector 805 may directly generate a distance estimate and the proximity criterion may comprise a requirement that the distance is below a given direction, such as for example that it is below, say, 20 m.

In some embodiments, the first access point 203 and the first wireless modem 111 may comprise dedicated ranging functionality which continuously can determine the distance between them based on the transmission of ranging radio signals from one entity and synchronization to these at the other entity. The resulting distance estimate may be fed to the proximity detector 805 where it may be compared to the distance threshold to detect when the vehicle/wireless modems enter the proximity zone.

In cases where the proximity detector 805 is part of the fixed network 107 (specifically it may be part of the first access point 203) and the distance determination is performed at the vehicle, the communication of the distance measure may include transmission over the air interface. Similarly, communication of the distance measure over the air interface may occur when the distance is determined at the network and the proximity detector 805 is implemented in the vehicle.

In some embodiments, the proximity detection may be based on time-of-flight measurements. For example, the clocks of the first access point 203 and the first wireless modem 111 may be synchronized and transmissions may include a time stamp which the receiving end can compare to its local clock to determine a difference. This difference may indicate the time-of-flight and may in many embodiments be used directly as a distance measure. This is practical using state-of-the-art technology. For example, LTE cellular systems support a timing advance adjustment of 32.5 ns which correspond to round-trip time increments of approximately 10 m. More recent ranging techniques being standardized in IEEE 802.11az aim to achieve a mobile position with an error of 0.1 m.

In some embodiments, the proximity detector 805 may be arranged to detect the proximity of the first wireless modem 111 to the first access point 203 based on a direction of arrival for the radio signal from the other entity, i.e. the proximity detector 805 may determine the direction of arrival at the first wireless modem 111 of a transmission from the first access point 203 and/or a direction of arrival at the first access point 203 of a transmission from the first wireless modem 111. The proximity detector 805 may detect the proximity in response to a detection that the direction of arrival(s) meet a given criterion.

It will be appreciated that different algorithms for determining a direction of arrival are known and that any suitable method may be used. For example, for an adaptive antenna array, a search may be performed to adapt the coefficients for each antenna to provide a maximum signal level or signal to noise ratio for a specific transmission, and the corresponding direction may be determined.

The proximity detector 805 may apply a proximity criterion which is based on the determined angle of arrival.

For example, the proximity detector 805 may in some embodiments be arranged to detect the proximity of the first wireless modem 111 to the first access point 203 in response to a detection that a direction of arrival of a transmission from the first access point 203 to the first wireless modem 111 meets a criterion. This may be particularly suited for a proximity detector 805 located on the vehicle, and e.g. specifically for a proximity detector 805 being colocated with or a part of the first wireless modem 111.

Correspondingly, alternatively or additionally, the proximity detector 805 may in some embodiments be arranged to detect the proximity of the first wireless modem 111 to the first access point 203 in response to a detection that a direction of arrival of a transmission from the first wireless modem 111 to the first access point 203 meets a criterion. This may be particularly suited for a proximity detector 805 located in the network, and e.g. specifically for a proximity detector 805 being colocated with or a part of the first access point 203.

In some embodiments, the criterion may comprise a requirement that a difference between the direction of arrival and a nominal direction for the antenna receiving the signal exceeds a threshold. The nominal direction may depend on the specific embodiment but may specifically be a direction between the first access point 203 and the first wireless modem 111/vehicle when this is far from the first access point 203, such as e.g. when it is halfway between the first access point 203 and the nearest first access point in the direction of the first access point 203 beam.

In some embodiments, the nominal direction may be relative to the vehicle itself. Specifically, the nominal direction for the first electronically steerable beamforming directional antenna of the first wireless modem 111 may be in a forwards direction of the train, i.e. towards the front.

A nominal direction for the directional beam of the first access point 203 may be in a direction from which the vehicle is expected to approach the first access point 203. For example, for a train embodiment, the nominal direction may be the direction along the train from the position of the first access point 203.

In many embodiments, the proximity detector 805 may detect if the angle if arrival differs by more than a threshold, and if so it may determine that the first wireless modem 111 is sufficiently close to the first access point 203, i.e. a proximity detection may be determined to have occurred. This approach may reflect that for many scenarios, the positional relationship between the first access point 203 and the first wireless modem 111 is such that the relative direction between them is approximately constant when the distance is large but as the vehicle approaches and passes the first access point 203 the directions may change substantially.

The approach may in particular be suitable for train embodiments where the train moves along a relatively straight track and the access points are positioned close to the track. When a train is at a distance from the first access point 203, the signals are received from directions along the track, i.e. the signal from the first wireless modem 111 is received by the first access point 203 from a direction along the track direction, and the signal from the first access point 203 is received by the first wireless modem 111 from along the track direction, and thus substantially from the front of the train.

However, as the train approaches the first access point 203, the signals will increasingly be received from directions that are not along the track, i.e. the first access point 203 will receive a signal which is increasingly at an angle sideways to the track direction and the first wireless modem 111 will also receive a signal that is increasingly sideways to the track and thus to the train. Indeed, when the first wireless modem 111 is directly outside the first access point 203, the line of sight may typically be directly perpendicular to the nominal directions. Thus, the angle of arrival relative to a nominal direction may in such a scenario increase from substantially zero to substantially 90° as the train approaches the first access point 203.

The proximity detector 805 may accordingly use a criterion which results in proximity being detected when the difference in directions exceed a threshold corresponding to e.g. the direction of arrival being at a suitable amount sideways to the track/train.

The direction of arrival may provide a reliable proximity detection in many embodiments based on the received signal.

Alternatively or additionally, the proximity detection may be based on the direction of the main beams formed by the directional antenna arrangement of the first access point 203 and/or the electronically steerable beamforming directional antenna of the first wireless modem 111.

The main beams may be formed to provide the best communication and thus may typically reflect the line of sight propagation path. The main beams may behave similarly to the behavior described for the direction of arrival estimates (except they may often be low pass filtered/averaged to a significant degree and therefore change slower than the direction of arrival estimates) and the same considerations may apply. Accordingly, the comments provided above for proximity detection based on the direction of arrival may also apply to the proximity detection based on the beam directions.

In some embodiments, the proximity criterion may include a consideration of the rate of change of the directions of arrival and/or of the main beams. Specifically, the proximity detector 805 may use a proximity criterion which comprises a requirement that a proximity detection may occur for the rate of change exceeding a threshold. This may reflect that for a constant speed, the change in the direction/angle is much slower when the vehicle is far from the first access point 203 than when it is very close to this. Thus, if the rate of change exceeds a threshold, this is likely to indicate that the first wireless modem 111 is very close to the first access point 203 and thus a proximity may be considered to have been detected by the proximity detector 805 if the rate of change exceeds a threshold.

In some embodiments, the system may comprise a position determiner which is arranged to directly determine a position of the first wireless modem from signals of an external positioning system. For example, the vehicle may comprise a satellite positioning system receiver which continuously determines the position of the train, and from this it may determine the position of the first wireless modem 111, or indeed it may directly determine the position of the first wireless modem 111 by being co-located with this. For example, the first wireless modem 111 may comprise a GPS receiver that continuously determines the position of the first wireless modem 111.

The proximity detector 805 may then compare the determined position with the position of the first access point 203 and if the difference is less than a given threshold, a proximity may be considered to be detected.

The position of the first access point 203 will typically be static and thus can be considered to be a predetermined position known prior to the establishment of the mm wave radio communication link.

In some embodiments, the first access point 203 may also comprise a GPS receiver determining the position of the first access point 203 and this may be fed to the proximity detector 805. In other embodiments, the position of the first access point 203 may be stored by the proximity detector 805 and retrieved when proximity detection operations are performed.

In scenarios where the position of the first access point 203 is not pre-stored in the proximity detector 805, data may be communicated to the proximity detector 805 describing the position of the first access point 203. For example, the position determined by a GPS receiver co-located with the first access point 203 may be communicated to the proximity detector 805 via any suitable path or means, including over the air interface to the vehicle if indeed the proximity detector 805 is implemented on the vehicle. Such communication of the position will not introduce much overhead as only a very small amount of data needs to be communicated. For example, in some embodiments, the position of the first access point 203 may be communicated to a proximity detector 805 on the vehicle as part of a handover/setup process when a new mm wave radio communication link to the first access point 203 is initialized.

The approach may provide efficient and reliable performance in many scenarios while allowing efficient and typical low cost implementation.

The described approach may thus in response to a proximity detection for the first wireless modem 111 switch data of a data flow from a first wireless modem 111 to a second aligned wireless modem 703 which is further from the first access point 203 with which the mm wave radio communication links are formed.

A data flow may specifically be an IP flow (i.e. data belonging to a particular 5-tuple comprising source and destination IP addresses and port numbers plus the protocol in use (e.g. TCP)) and the switching from one wireless modem to another wireless modem may be by scheduling some data that would otherwise be communicated over a first mm wave radio communication link with the first wireless modem 111 to be communicated over a second mm wave radio communication link with a second aligned wireless modem 703.

The switching of a data flow may specifically change the forwarding behavior of the packets of the data flow over the air interface, and over the wired path on the train to reach the end node 105. From the access point there exist wireless paths to the first and second modems, so switching must change the destination MAC address used over the air interface to target the chosen modem (downstream traffic).

This could be performed on a packet by packet basis, when both wireless links remain in use, but their relative loading is adjusted as a result of the proximity detection, or all packets could be re-forwarded in case of a hard switch.

In some embodiments, the switch may be partial in that the mm wave radio communication link to the first wireless modem 111 may still be used after proximity detection but e.g. with a substantially reduced data rate e.g. supporting some data flows whereas other data flows are switched to the second aligned wireless modem 703. Partial switching on a packet by packet basis of an individual data flow is also possible.

In many embodiments, however, the switch controller 807 is arranged to switch the data flow to the second mm wave radio communication link such that no data of the data flow is communicated over the first mm wave radio communication link.

The switch controller 807 may specifically ensure that no data is transmitted over the first mm wave radio communication link to the first wireless modem 111 and that all data that would be transmitted on this link is instead transmitted to the second aligned wireless modem 703 over a second mm wave radio communication link.

For example, prior to the proximity detection, the data flow to the end node 105 may be set up to use both the first and the second mm wave radio communication link, i.e. communication may use both the first wireless modem 111 and the second aligned wireless modem 703. This may for example be achieved using a multipath proxy approach as will be described later.

When the proximity detection occurs, the switch controller 807 may then control the system to switch all the data that would otherwise be communicated on the first mm wave radio communication link to be communicated on the second mm wave radio communication link (and possibly other communication links formed with other wireless modems). This may often result in a multipath communication being reduced to a single path communication. When the first wireless modem 111 exits the proximity zone, the communication may for example revert to multipath communication.

It will be appreciated that the switch controller 807 may use any suitable approach to switch the data flow. In many embodiments, it may be arranged to control the scheduler 801 to not schedule data for the data flow over the first mm wave radio communication link when proximity has been detected. In many embodiments, the switch controller 807 may indeed be implemented as part of the scheduler 801.

As another example, in some embodiments using multipath proxy communication, the switch controller 807 may be arranged to terminate or drop the sub-path that is via the first wireless modem 111. The switch controller 807 may for example control or be part of the aggregator 803 and control this to drop the sub-path including the first wireless modem 111.

It will be appreciated that depending on the location of the switch controller 807 and the proximity detector 805 relative to the other functionality supporting or controlling the data flow, the system may implement suitable communication between the entities. Specifically, the system may provide a communication or control path between the proximity detector 805 and the switch controller 807 if not co-located, and similarly between the proximity detector 805 and/or the switch controller 807 and any other element of the system as required. Such communication links and paths may typically use the communication system itself for the communication including using the air interface to supporting data communication required between entities of the fixed network 107 and of the vehicle based network.

However, in many embodiments, the proximity detector 805 and the switch controller 807 may be implemented together with each other, and potentially with other functionality involved in the described approach. Specifically, the proximity detector 805 and the switch controller 807 may in many embodiments be part of the first access point 203 itself and may be closely integrated with or a be part of the scheduler 801.

In the system, data of the end to end flow between the correspondent node 105 and the end node 101 may be communicated over different paths including over multiple mm wave radio communication links as described above. In many embodiments, the end to end flow may be divided into a number of subflows which may then be communicated over the different paths.

In such systems, aggregator functions may be included to control the multipath subflows. Such an aggregation function may have two parts. For transmission, it may schedule packets. For the downlink direction, this may simply involve identifying which packets to send on which downlink link, i.e. on which multipath. For the uplink, the same function may be used or it may just involve putting data into the appropriate queue. For example, in the described scenario an aggregator on the train may push packets towards the first wireless modem 111 or the second wireless modem 113 depending on the latest radio metrics, and specifically dependent on a link quality. Thus, typically, an aggregator includes a scheduling function for the transmission of data packets over subflows.

On the receiving side, an aggregator function may combine the received data packets into a single data stream for onwards transmission. The aggregator function will typically include a reordering of the received data packets and may specifically operate a reordering queue to maintain in-sequence delivery. Thus, an in sequence single data flow may be generated where data packets are transmitted in the appropriate order.

In many embodiments, the system may include a fixed network aggregator 803 which is arranged to couple a connection for the correspondent node 105 to a plurality of subflows with each subflow being associated with one wireless modem of vehicle, and specifically different subflows may be associated with different aligned wireless modems. On the vehicle there exists a corresponding aggregator 809, located in one of the modem devices, or another device on the train network, or the end node 101. There is a single connection from the vehicle aggregator 809 on the vehicle and the end node 101. The fixed network aggregator 803 load balances packets out into multiple subflows between the fixed network aggregator 803 over the air interface to the wireless modems 111, 703, and then to the vehicle based complementary aggregator 809.

In the example of FIG. 8, the fixed network aggregator 803 is part of the access point communicating with the vehicle over the aligned radio communication links. However, it will be appreciated that in other embodiments, the fixed network aggregator 803 may be positioned at other positions in the fixed network and e.g. be implemented with other network entities, such as e.g. in the router implementing the MAG.

In the example, each of the subflows has an associated communication path to the corresponding aligned wireless modem 111, 703 and the fixed network aggregator 803 is arranged to support subflows having communication paths via different wireless modems. Accordingly, a plurality of subflows may be used to traverse the air interface between the fixed network 107 and the train 103 and with these subflows being supported by different wireless modems 111, 703 and different mm wave radio communication links. In some embodiments, some of the subflows may be over non-aligned modems, for example one subflow may be established using a radio communication link between a second access point 205 and another wireless modem (not illustrated in FIG. 8).

The communication paths for the subflows are determined by the mobility management of the fixed network aggregator 803 which may be colocated and interwork with a mobility anchor.

In some embodiments, the subflows for a given fixed network aggregator 803 may only be distributed over aligned wireless modems and the fixed network aggregator 803 may be implemented in the access point of a set of aligned wireless modems.

In other embodiments, the fixed network aggregator 803 may utilize subflows that include aligned modems as well as non-aligned modems. For example, some subflows may be implemented using aligned wireless modems for one access point whereas other subflows may utilize radio communication links for another base station (and potentially may generate subflows corresponding to other sets of aligned wireless modems, i.e. a plurality of subflows may be generated for aligned modems of a plurality of access points).

In some embodiments, subflows being generated using a plurality of access points may be achieved by a fixed network aggregator 803 being colocated with a mobile anchor, such as a MAG or LMA. In other embodiments, the fixed network aggregator 803 may still be located at the access point and the network may comprise functionality for forwarding data packets/datagrams for subflows for other access points to these other access points.

In some embodiments, the functionality of the fixed network aggregator 803 may be distributed across different logical and physical network entities.

Each of the subflows maintained by the fixed network aggregator 803 may be associated with a separate radio communication link and thus with a pairing of an access point and a wireless modem.

The subflows may be combined by a suitable node or entity at the vehicle. Specifically, in many embodiments, the end node 101 itself may be simultaneously connected to each of the plurality of wireless modems 111, 703 and may be arranged to combine datagrams received from different radio communication links. In other embodiments, a corresponding complementary aggregator may be included on the vehicle and this complementary aggregator may be arranged to combine the subflows into a single proxy connection to the end node 101.

Specifically, the vehicle may comprise an aggregator which may be part of a network element 501 of the vehicle subnetwork. The aggregator may be arranged to combine data for the end node 101 received via the different mm wave radio communication links into a single data stream and forwarding this data stream to the end node. The aggregator may specifically be in the form of a vehicle aggregator 809 which is complementary to the fixed network aggregator 803 and which works with the fixed network aggregator 803 to support routing of a data flow (such as the end to end flow between the end node 101 and the correspondent node 105) via a plurality of subflows.

Figure 10:
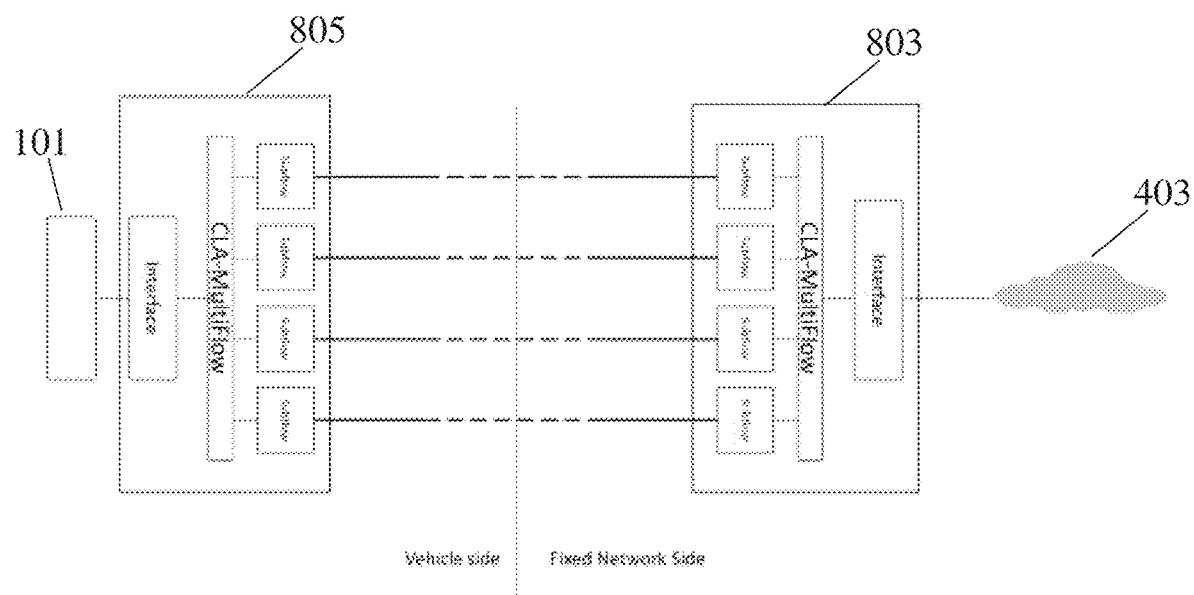
FIG. 10 illustrates an example of elements of a multipath proxy arrangement for a wireless communication system in accordance with some embodiments of the invention.

FIG. 10 illustrates an example of a system of two multipath proxies utilizing subflows for communication. In the example, a vehicle aggregator 809 may provide a single flow connection for the end node 101 and a fixed network aggregator 803 may provide a single flow connection for the fixed network. The connection between the two proxies is by a plurality of subflows each of which may use a specific radio communication link, and thus a specific combination of access point and wireless modem.

Figure 11:
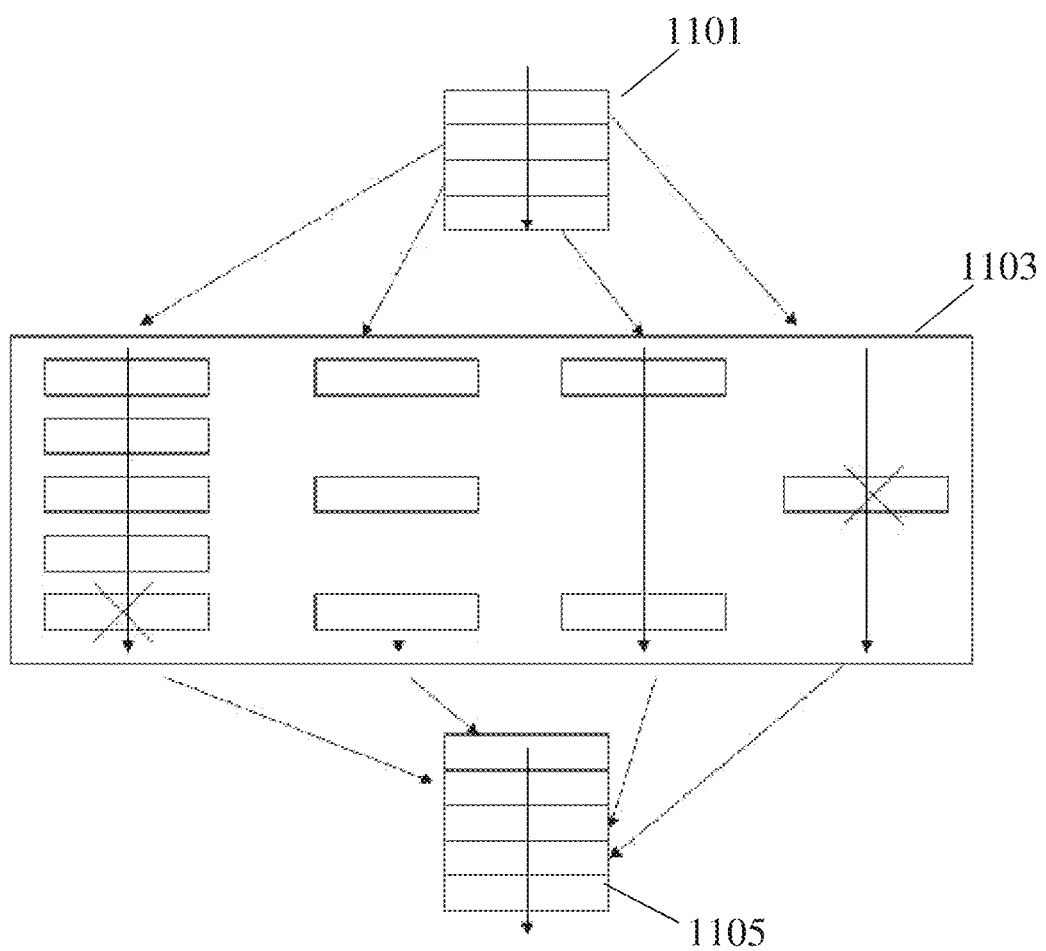
FIG. 11 illustrates an example of elements of operation of a multipath proxy arrangement for a wireless communication system in accordance with some embodiments of the invention.

FIG. 11 illustrates an example of the operation of the multipath subflow communication. In the example, an input set of data packets 1101 are received in a given order. These may be routed via a plurality of subflows 1103 with data packets being distributed over the different subflows 1103. The subflows 1103 may then be combined into a single flow 1105, i.e. a single set of output data packets may be generated.

Due to different properties of the different subflows, the data packets may be received in a different order than in the input set of data packets 1101, and the receiving aggregator may reorder the output data packets to have the correct order to generate and in-sequence data output.

Further, the system may implement a multi-radio communication link management protocol which e.g. includes a retransmission scheme where missing or erroneous data packets are retransmitted. This may be implemented across the subflows and thus a missing data packet that was transmitted on one subflow may be retransmitted on a different subflow.

The aggregators may for example comprise a MultiPath Transmission Control Protocol, MPTCP, proxy (as e.g. described in the Internet Engineering Task Force (IETF) RFC 6824 and US2016/0366049A1) which can provide functionality for mapping a single proxy connection to a plurality of subflows. In the system, each of the generated subflows is not merely a path/connection through the network but is specifically linked with a specific radio communication link and thus it represents/is linked to a specific wireless communication link across the air interface.

Specifically, the aggregators can use MPTCP in which case the subflows are individual TCP subflows that operate to the MPTCP termination point. There may be a MPTCP instance for each application running on the end node 101 which requires a TCP socket connection. The MPTCP may be terminated in the end node 101 when it operates a native MPTCP protocol stack.

Alternatively, a second MPTCP proxy located on the train/vehicle can terminate MPTCP, with an additional communication link to the end node 101. For example, this additional link could be over a wireless LAN (WLAN) located on the train. The additional link may involve multiple hops over intermediate network nodes, for example, via a wireless router or a WLAN access point. MPTCP supports several mechanisms to add and remove subflows. The vehicle aggregator 809 may thus be implemented in the end node 101 itself or in another network entity of the vehicle subnetwork.

When a wireless modem loses connectivity with an AP, for example, when it suffers a deep fade, the subflow may be maintained or torn down. When the same wireless modem later re-establishes a wireless connection to the AP, the TCP subflow can be used again, if it was maintained, or if it was torn down it can be re-established.

Using multiple modems allows connectivity to be maintained to the vehicle (and end node 101) as modems connect and disconnect, by maintaining at least one modem connection at any point in time (make before break operation). It should be noted that typically the connection and disconnection of modems is a consequence of the limited range and steerability of the modem to AP links, coupled with the design objective of maximizing the separation of adjacent APs.

Each MPTCP instance is able to transmit packets over any of the subflows that are active, according to the scheduling principle it employs. This includes redundancy operation in which a packet is sent over multiple subflows at the same time. The MPTCP receiver is able to reorder TCP segments by exploiting a MPTCP sequence number. It also generates MPTCP level acknowledgements that enable the transmitting MPTCP to resend packets.

In another embodiment, the aggregator employs a packet-data convergence protocol (PDCP). The protocol has been defined by 3GPP, and includes support for dual LTE connections from a UE, and aggregation of LTE plus and Wi-Fi links by a UE. The inventors have realized that the protocol features that include PDCP PDU scheduling, in-sequence delivery and exchange of performance metrics may be reused in the case described herein. Unlike the 3GPP multi-connectivity cases listed above, in this instance only a single access point is used.

The described approach may typically provide a high degree of flexibility and improved performance while allowing compatibility with many existing approaches, algorithms, applications and devices. In particular, the use of multiple radio communication links for one access point enabled by the use of beams of the aligned wireless modems being substantially in the same direction provides. This allows an effective and quick adapting air interface diversity without requiring complex processes and typically without requiring changes to the operation of other nodes, services, or devices.

Specifically, the correspondent node 105 may operate exactly as if it were serving a fixed client, and it need not have any knowledge that the communication session is with a mobile node. Nor does the correspondent node 105 need to be aware of any multipath operation but rather it simply communicates with the aggregator 809 using a single connection and a single IP address.

As an example, a passenger on the train may initiate a web browsing service and access a server at the correspondent node 105. This initial access may for example be routed to the correspondent node 105 via the first wireless modem 111, the first access point 203, the first mobile access gateway 209, and the mobility anchor 207. In response, a communication session may be setup in which the correspondent node 105 is provided with the address for the first wireless modem 111 as the address of the originating node (e.g. with a Network Address Translation, NAT, being located at the first wireless modem 111 for translating this into a local address for the end node 101).

The correspondent node 105 will accordingly proceed to address datagrams to the end node 101 using the address of the first wireless modem 111. The mobility anchor 207 will publish that it is a mobility anchor for the address of the first wireless modem 111 and will accordingly receive these datagrams. It will further perform mobility management for the first wireless modem 111 as well as for another wireless modem which specifically may be aa second aligned wireless modem 703 facing in the same direction as the first wireless modem 111 and being connected to the first access point 203 over a radio communication link.

The received datagrams are passed to first access point 203 which may comprise a fixed network aggregator 803 that provides subflows over a plurality of aligned radio communication links and a scheduler 801 (which may often be part of the fixed network aggregator 803) may schedule the datagrams over the multiple subflows and thus over the multiple aligned radio communication links.

The fixed network aggregator 803 thus implements an aggregator for the communication session with multiple subflows with different aligned wireless modems 111, 703. E.g. the fixed network aggregator 803 may establish a subflow for the first wireless modem 111 and another subflow for the second aligned wireless modem 703.

When the fixed network aggregator 803 receives a datagram addressed to the first end node 101, it may now forward this datagram on one of the subflows. Some datagrams addressed to the end node 101 may accordingly not be forwarded on the subflow for the first aligned wireless modem 111 but may be forwarded on the subflow for the second aligned wireless modem 703. Accordingly, although the datagram is addressed to the end node 101, it is transmitted across the air interface using the second aligned wireless modem 703.

The operation on the vehicle side of the system may be different in different embodiments and scenarios.

For example, in many embodiments, a complete network may be implemented in the train. Specifically, an IP based network may be implemented, such as e.g. a Wi-Fi based Local Area Network, LAN. In some such embodiments, each (or at least some of the) wireless modems 111, 113, 701, 703 may also be coupled to Wi-Fi access points for nodes on the train.

In some such embodiments, multiple connections may be established between the end node 101 and the wireless modems 111, 113, 701, 703. For example, a separate IP connection may be established between the end node 101 and each of a plurality of aligned wireless modems 111, 703 which supports a subflow for the end node 101. In this case, each wireless modem 111, 703 receiving a datagram for the communication session established for the end node 101 and the correspondent node 105 may be arranged to forward this datagram directly to the end node 101 on the established IP connection. For example, if the second aligned wireless modem 703 receives a datagram on a subflow, it will forward this directly to the end node 101 even if the datagram was addressed to the first wireless modem 111 by the correspondent node 105.

Such an approach may be considered to correspond to the end node 101 implementing a complementary aggregator to the one operating in the fixed network. The end node 101 may combine the data received from different wireless modems 111, 113, 701, 703 to a single data stream corresponding to the one transmitted by the correspondent node 105.

In other embodiments, the vehicle side network (the network at the vehicle side of the air interface) may comprise a second complementary aggregator which is arranged to combine the multiple subflows into a single proxy connection for the end node 101. In such an approach, the wireless modems 111, 113, 701, 703 may be arranged to forward datagrams to the complementary aggregator (the vehicle aggregator 809) which will then be arranged to combine the received datagrams and forward them to the end node 101. In such an approach, the end node 101 accordingly simply establishes a single connection (to the complementary aggregator), and the network (the combination of the vehicle side network and the fixed network 107) performs the necessary operation to provide the mobility support based on network implemented air interface diversity.

In some embodiments, the complementary aggregator may effectively be linked to one of the wireless modems 111, 113, 701, 703. For example, the wireless modems 111, 113, 701, 703 may be coupled to each other, e.g. via a vehicle side network, and may be arranged to communicate data with each other. In such a case, the wireless modems 111, 113, 701, 703 may be arranged to forward datagrams received on a given subflow to the specific wireless modem 111, 113, 701, 703 that is addressed by the correspondent node 105. For example, the second wireless modem 113 may forward any datagrams received and addressed to the first wireless modem 111 to the first wireless modem 111. The first wireless modem 111 may then operate a complementary aggregator or may forward the data to a node that does so.

It will be appreciated that different approaches for providing multiple destination indications/addresses may be used in different embodiments, and specifically for identifying both e.g. a wireless modem and the end node. In some embodiments, this may for example be achieved using tunneling. In other embodiments, port numbers may be used to identify the specific end node 101.

It will be appreciated that the scheduler 801 may use different algorithms, criteria, and approaches for selecting which subflow to use for a given datagram.

Indeed, in some embodiments, the scheduler 801 may simply select a subflow at random or e.g. in accordance with a pattern/probability that is dependent on the current link qualities. In such embodiments, datagrams that are not received at the end node 101 (or possibly the wireless modem 111, 113, 701, 703) may be requested to be retransmitted (either directly by the destination detecting a missing datagram and requesting this to be retransmitted, or indirectly by no acknowledgment being received when employing an acknowledgement and retransmit scheme). The retransmissions may in some embodiments again use a random or changing subflow and, in some embodiments, may be required to use a different subflow than the original transmission.

Such an approach will result in datagrams not being lost due to e.g. temporary losses of the corresponding wireless link but rather being retransmitted using air interface diversity.

The fixed network aggregator 803 may be considered to comprise the scheduler 801 which may be arranged to select subflows for the datagrams in response to the link qualities of wireless links associated with the subflows.

The link quality may for example be indicative of a current throughput or error rate for the wireless link of the given subflow.

This link qualities may in some embodiments be determined by the fixed network aggregator 803 itself. For example, it may continuously for each subflow monitor whether datagrams are successfully acknowledged or not. If a large number of retransmissions are required on a subflow, it may be considered that the current throughput is low and that the current error rate is high. Accordingly, the weighting of this subflow may be reduced and other subflows may be weighted higher. Additionally, the multipath protocol on the vehicle may signal to the aggregator regarding the termination of a subflow or the priority or relative priority of a subflow(s). When the multipath protocol is MPTCP, these could be carried by FIN and MP_PRIO messages.

In other embodiments, the fixed network aggregator 803/ scheduler 801 may determine an indication of the wireless link status in response to signaling and data received from another node, such as specifically from one of the access points 109. For example, the access points 109 may measure a (n averaged) packet or bit error for the wireless links and may report this to the scheduler 801. The scheduler 801 may then prioritize the individual subflows in response to the measured error rate. In other embodiments the wireless link status may be represented by radio measurements such as received power, signal-to-noise-ratio etc.

An advantage of such adaptable selection of the subflows is that it allows a faster adaptation to the changing wireless conditions.

In many embodiments, the fixed network aggregator 803 may further be arranged to change the subflows in response to the mobility management, and specifically may be arranged to remove a subflow and/or to add a subflow in response to the mobility management.

In many embodiments, the fixed network aggregator 803 may be arranged to do so in response to the mobility management detecting that a wireless link has changed from an active status to a passive status, typically corresponding to a change of a wireless link from performing acceptable to performing unacceptably (e.g. with respect to throughput, error rate, etc).

In some embodiments, the mobility management may for example detect that the condition of a wireless link has deteriorated to the point where it is no longer usable, and it may designate the wireless link as inactive. This decision may be indicated to the fixed network aggregator 803 which accordingly may proceed to remove the subflow from the list of subflows currently being used.

In embodiments using multipath propagation and specifically using multipath aggregators and/or proxies as described, the switch controller 807 may be arranged to switch data in response to the proximity detection by modifying the subflow operation.

Specifically, the first mm wave radio communication link and the second mm wave radio communication link may be associated with separate subflows when the vehicle is not close to the first access point 203. When the proximity detector 805 then detects that the first wireless modem is close to the first access point 203, the switch controller 807 may control the multipath scheduling function which in accordance may change its scheduling algorithm/criteria to bias data away from the subflow of the first mm wave radio communication link and towards the subflow of the second mm wave radio communication link.

For example, the allocation based on radio link quality may be biased by offsetting the radio link qualities for the subflows by increasing the radio link quality for the second mm wave radio communication link and/or reducing it for the first mm wave radio communication link. This will result in more data being allocated on the subflow of the second mm wave radio communication link and less on the subflow of the first mm wave radio communication link in comparison to when no proximity detection has occurred.

In some embodiments, the switch controller 807 may simply control the multipath scheduler/aggregator/proxy to terminate the subflow for the first mm wave radio communication link when a proximity detection occurs. This will result in the data being communicated over the other subflows and thus over other mm wave radio communication links and via other wireless modems.

The previous description has focused on a single communication session being supported. However, it will be appreciated that the approach may be used to simultaneously support a plurality of different communication sessions including sessions for different end nodes, users, and devices.

In such scenarios, the system may be arranged to employ multiple parallel multipath proxies, and specifically may e.g. establish an aggregator for each communication session or correspondent node connection. In a typical scenario, the network may accordingly simultaneously implement a potentially large number of mobile proxies each with a number of subflows. The total number of subflows may therefore be relatively large.

It will be appreciated that whereas the approach has been described with a focus on applying the aggregator approach in communicating from the correspondent node 105 to the end node 101, the aggregator approach is also applicable to communication of data from the end node 101 to the correspondent node 105.

The current approach may address the challenges posed, and specifically it may provide an air interface diversity approach that allows very efficient performance for fast moving vehicles and (relatively) short range radio links. The approach can furthermore be implemented with low complexity and does not require large overheads or resource usage. It may also require little or no modifications to many nodes of the communication system.

The use of aligned modems with beamforming in the same direction provides a substantial improvement as it allows quick and efficient adaptation to changes in the radio propagation conditions. It may for example provide improved throughput and session continuity in many situations. For example, colocated access points using directional antennas aimed in different directions often have a dead zone of reduced coverage around the location of the access points (for example the beams may have notches in a direction perpendicularly to the main beam and thus a dead zone may exist directly in front of the access points as this corresponds to a perpendicular direction for the beams of both access points). In such cases, the use of multiple aligned wireless modems may ensure that if one wireless modem is in such a dead zone, the other wireless modem(s) will not be in the dead zone and thus data can advantageously be routed via these wireless modem(s).

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way.

We claim:

1. A communication system for supporting communication between an end node of a vehicle and a remote correspondent node via a fixed network, the communication system comprising:
a plurality of wireless access points of the fixed network including at least a first access point having a directional antenna arrangement for mm wave radio communication using directional beams;
a first wireless modem for establishing a first mm wave radio communication link to the first access point supporting communication between the end node of a vehicle and the remote correspondent node, the first wireless modem being located on the vehicle and employing a first electronically steerable beamforming directional antenna having a first main beam for establishing the first mm wave radio communication link;
a second wireless modem for establishing a second mm wave radio communication link to the first access point supporting communication between the end node of a vehicle and the remote correspondent node, the second wireless modem being located on the vehicle and employing a second electronically steerable beamforming directional antenna having a second main beam for establishing the second mm wave radio communication link;
a proximity detector for detecting a proximity of the first wireless modem to the first access point; and
a switch controller for switching data of a data flow from the first mm wave radio communication link to the second mm wave radio communication link in response to the detection of the proximity of the first wireless modem to the first access point.

2. The communication system of claim 1, wherein the switch controller is arranged to switch the data of the data flow from the first mm wave radio communication link to the second mm wave radio communication link for the second wireless modem being further from the first access point than the first wireless modem.

3. The communication system of claim 1, wherein the proximity detector is arranged to detect the proximity of the first wireless modem to the first access point in response to a detection that a direction of arrival of a transmission from the first access point to the first wireless modem meets a criterion.

4. The communication system of claim 3, wherein the criterion comprises a requirement that a difference between the direction of arrival and a nominal direction for the first electronically steerable beamforming directional antenna exceeds a threshold.

5. The communication system of claim 1, wherein the proximity detector is arranged to detect the proximity of the first wireless modem to the first access point in response to a detection that a direction of arrival of a transmission from the first wireless modem to the first access point meets a criterion.

6. The communication system claim 1, wherein the proximity detector is arranged to detect the proximity of the first wireless modem to the first access point in response to a direction of the first main beam meeting a criterion.

7. The communication system claim 1, wherein the proximity detector is arranged to detect the proximity of the first wireless modem to the access point in response to a direction of a directional beam of the directional antenna arrangement for the first mm wave radio communication meeting a criterion.

8. The communication system of claim 1, further comprising a position determiner arranged to determine a position of the first wireless modem from signals of an external positioning system, and wherein the proximity detector is arranged to detect the proximity of the first wireless modem to the access point in response to a comparison of the position of the first wireless modem to a predetermined position of the first access point.

9. The communication system of claim 1, wherein the switch controller is arranged to switch data of the data flow to the second mm wave radio communication link such that no data of the data flow is communicated over the first mm wave radio communication link.

10. The communication system of claim 1, wherein the first and second electronically steerable beamforming directional antennas are at least 20 meters apart.

11. The communication system of claim 1, wherein the first wireless modem and the second wireless modem have different MAC addresses.

12. The communication system of claim 1, further comprising an aggregator located on the vehicle and arranged to combine data for the end node received via the first mm wave radio communication link and data for the end node received via the second mm wave radio communication link into a single in-sequence data stream and forwarding this data stream to the end node.

13. The communication system of claim 1, further comprising a multipath controller arranged to allocate data of the data flow over a plurality of subflows, each subflow using a different mm wave radio communication link; and wherein the switch controller is arranged to switch data of the data flow by controlling the multipath controller to bias the allocation of data of the data flow towards a subflow for the second mm wave radio communication link relative to a subflow of the first mm wave radio communication link in response to the detection of the proximity of the first wireless modem to the first access point.

14. The communication system of claim 1, wherein the first wireless modem and the second wireless modem are positioned proximal to opposite ends of the vehicle.

15. The communication system of claim 1 wherein the first wireless modem comprises a first beam adapter for adaptively steering the first main beam towards the first access point and the second wireless modem comprises a second beam adapter for adaptively steering the second main beam towards the first access point.

16. The communication system of claim 1, wherein the first access point comprises an electronically steerable beamforming directional antenna arranged to steer beams towards the first wireless modem and the second wireless modem.

17. An apparatus for a communication system for supporting communication between an end node of a vehicle and a remote correspondent node via a fixed network, the communication system comprising:
  a plurality of wireless access points of the fixed network including at least a first access point having a directional antenna arrangement for mm wave radio communication using directional beams;
  a first wireless modem for establishing a first mm wave radio communication link to the first access point supporting communication between the end node of a vehicle and the remote correspondent node, the first wireless modem being located on the vehicle and employing a first electronically steerable beamforming directional antenna having a first main beam for establishing the first mm wave radio communication link;
  a second wireless modem for establishing a second mm wave radio communication link to the first access point supporting communication between the end node of a vehicle and the remote correspondent node, the second wireless modem being located on the vehicle and employing a second electronically steerable beamforming directional antenna having a second main beam for establishing the second mm wave radio communication link;
  and the apparatus comprising:
  a proximity detector for detecting a proximity of the first wireless modem to the first access point; and
  a switch controller for switching data of a data flow from the first mm wave radio communication link to the second mm wave radio communication link in response to the detection of the proximity of the first wireless modem to the first access point.

18. A method of operation for a communication system supporting communication between an end node of a vehicle and a remote correspondent node via a fixed network, the communication system comprising:
  a plurality of wireless access points of the fixed network including at least a first access point having a directional antenna arrangement for mm wave radio communication using directional beams;
  a first wireless modem for establishing a first mm wave radio communication link to the first access point supporting communication between the end node of a vehicle and the remote correspondent node, the first wireless modem being located on the vehicle and employing a first electronically steerable beamforming directional antenna having a first main beam for establishing the first mm wave radio communication link;
  a second wireless modem for establishing a second mm wave radio communication link to the first access point supporting communication between the end node of a vehicle and the remote correspondent node, the second wireless modem being located on the vehicle and employing a second electronically steerable beamforming directional antenna having a second main beam for establishing the second mm wave radio communication link;
  and the method comprising:

detecting a proximity of the first wireless modem to the first access point; and switching data of a data flow from the first mm wave radio communication link to the second mm wave radio communication link in response to the detection of the proximity of the first wireless modem to the first access point.

\* \* \* \* \*